US011893846B2

(12) United States Patent
Ruffkess et al.

(10) Patent No.: US 11,893,846 B2
(45) Date of Patent: Feb. 6, 2024

(54) DEVICES, SYSTEMS, APPARATUSES, AND METHODS FOR SMART CAM LOCKS AND KEY LOCK BOXES

(71) Applicant: BOXLOCK, INC., Atlanta, GA (US)

(72) Inventors: Brad Ruffkess, Atlanta, GA (US); Brian Vanhiel, Smyrna, GA (US); Taylor Davis, Seattle, WA (US); Daniel K. Guthrie, Ball Ground, GA (US)

(73) Assignee: BoxLock, Inc., Atlanta, GA (US)

( * ) Notice: Subject to any disclaimer, the term of this patent is extended or adjusted under 35 U.S.C. 154(b) by 0 days.

(21) Appl. No.: 17/424,910

(22) PCT Filed: Apr. 2, 2021

(86) PCT No.: PCT/US2021/025530
§ 371 (c)(1),
(2) Date: Jul. 22, 2021

(87) PCT Pub. No.: WO2021/207017
PCT Pub. Date: Oct. 14, 2021

(65) Prior Publication Data
US 2023/0162548 A1    May 25, 2023

Related U.S. Application Data

(60) Provisional application No. 63/005,604, filed on Apr. 6, 2020.

(51) Int. Cl.
*G07C 9/00* (2020.01)
*G01K 1/024* (2021.01)
*G01K 3/00* (2006.01)
*G06K 7/14* (2006.01)
(Continued)

(52) U.S. Cl.
CPC ......... *G07C 9/00857* (2013.01); *G01K 1/024* (2013.01); *G01K 3/005* (2013.01);
(Continued)

(58) Field of Classification Search
CPC .................. G07C 9/00; G07C 9/00857; G07C 2009/0088; G01K 1/00; G01K 1/024;
(Continued)

(56) References Cited

U.S. PATENT DOCUMENTS 8,780,201 B1 * 7/2014 Scalisi ................ H04N 7/186
348/143
2015/0101370 A1 * 4/2015 Russo ................ E05B 47/0001
70/283.1
(Continued)

*Primary Examiner* — Nathan Cumar
(74) *Attorney, Agent, or Firm* — Morris, Manning & Martin, LLP; Daniel E. Sineway, Esq.

(57) ABSTRACT

The present disclosure generally relates to providing electronic locking systems. Using novel designs and network technology, the present systems, methods, and apparatuses can provide a secure alternative to a cam lock or a lock box for storing items that may be left unattended, without the use of a physical key. For example, in certain embodiments, the present systems, methods, and apparatuses can facilitate the locking and unlocking of a cam lock or a lock box by using a digital construct, an encryption system, and various native and/or third-party software components.

28 Claims, 19 Drawing Sheets

(51) Int. Cl.
 *E05B 39/04* (2006.01)
 *E05B 47/00* (2006.01)
(52) U.S. Cl.
 CPC ............ *G06K 7/1408* (2013.01); *E05B 39/04* (2013.01); *E05B 47/0012* (2013.01); *E05B 2047/002* (2013.01); *E05B 2047/0017* (2013.01); *G07C 2009/0088* (2013.01)
(58) Field of Classification Search
 CPC ............ G01K 3/00; G01K 3/005; G06K 7/00; G06K 7/1408; G06K 7/1413; G06K 7/1417; G06K 7/1421; G06K 7/1426; G06K 7/143; G06K 7/1434; E05B 39/00; E05B 39/05; E05B 47/00; E05B 47/0012; E05B 2047/00; E05B 2047/0017; E05B 2047/002; E05B 2047/0021; E05B 2047/0022
 USPC ........................................................ 70/263
 See application file for complete search history.

(56) References Cited

U.S. PATENT DOCUMENTS

| | | | |
|---|---|---|---|
| 2016/0060903 A1* | 3/2016 | Russo | E05B 21/066 70/276 |
| 2016/0260271 A1* | 9/2016 | Belhadia | G06F 21/35 |
| 2017/0011573 A1* | 1/2017 | Belhadia | G07C 9/00563 |
| 2017/0053467 A1* | 2/2017 | Meganck | G07C 9/00563 |
| 2017/0243425 A1* | 8/2017 | Meganck | G07C 9/00174 |
| 2018/0102009 A1* | 4/2018 | Belhadia | G07C 9/00571 |

* cited by examiner

FIG 1: EXEMPLARY SYSTEM ENVIRONMENT

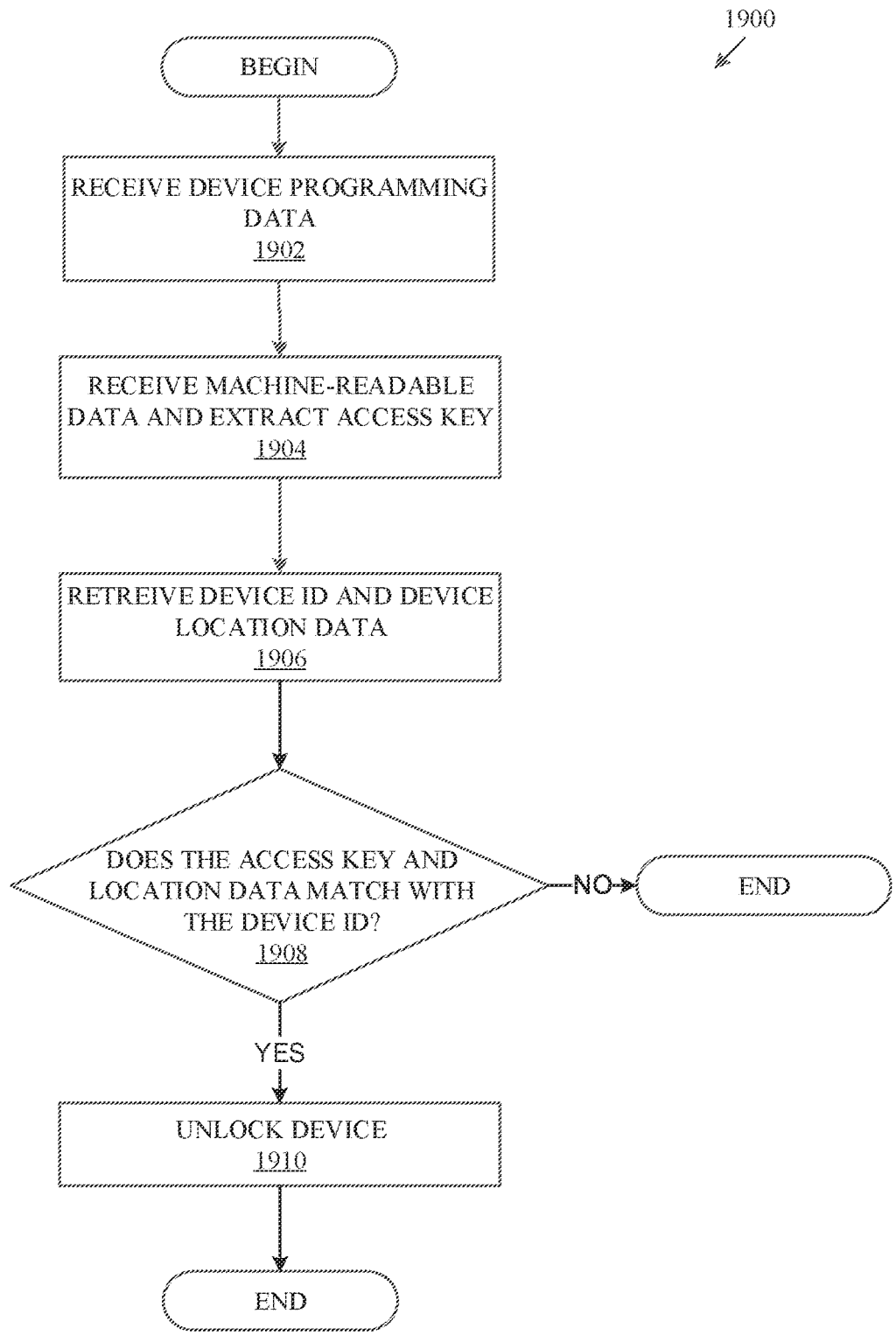
FIG. 19: EXEMPLARY LOCK OPENING PROCESS

DEVICES, SYSTEMS, APPARATUSES, AND METHODS FOR SMART CAM LOCKS AND KEY LOCK BOXES

CROSS REFERENCE TO RELATED APPLICATIONS

This application claims priority to, the benefit under 35 U.S.C. § 119 of, and incorporates by reference herein in its entirety U.S. Provisional Patent Application No. 63/005,604, filed Apr. 6, 2020, entitled "Devices, Systems, Apparatuses, and Methods for Smart Cam Locks and Key Lock Boxes."

TECHNICAL FIELD

The present devices, systems, apparatuses, and methods relate generally to a smart cam lock system for providing digital keyed security and a smart key lock box system for protection of keys or other small objects.

BACKGROUND

Cam locks are used in a multitude of applications, including on postal boxes, medical/laboratory boxes, cabinets, bicycle locks, furniture, vending machines, cash registers, safes, and a host of other devices that have a need for an embedded or cylindrical locking mechanism. Existing cam locks have several challenges, however. For example, current devices that use cam locks for security are limited to using a physical key, key card, key fob or mobile device to access or unlock them. Thus, distributing cam lock access requires sharing physical keys, which can be lost, mobile applications, or sharing/remembering passcodes, which can be forgotten. These existing cam lock solutions cannot be used flexibly or on-demand with many different types of users, especially while maintaining safety and security of passcodes and physical keys.

Similarly, key lock boxes are used for a variety of applications, including by realtors, landlords/tenants, rental property owners, automobile dealers, and others that wish to leave a key or other small item to be accessed by a third party at a later date. Most existing lock boxes operate using a keypad or numerical combination to gain access to the items within. Thus, use of a code requires mobile applications, sharing/remembering of passcodes and combinations amongst many different users, which can lead to inefficiencies and a vast array of security issues.

Therefore, there exists a long-felt but unresolved need for a connected, keyless/combination-less smart cam lock and key lock box that allows for high-security, distributed access, and ease of use.

BRIEF SUMMARY OF DISCLOSURE

Briefly described, and according to one embodiment, aspects of the present disclosure generally relate to systems, methods and apparatuses for a smart cam lock for keyless securing of doors, drawers, containers, and other suitable devices, and a smart lock box for keyless protection of keys, credit cards, and other valuable items. Traditionally, cam locks and lock boxes required the input of a mobile application, physical key, or passcode to unlock the device and gain access to the contents being secured. In these traditional embodiments, controlling and monitoring access to the secured devices was difficult to accomplish without having visual surveillance present at all times. Furthermore, in the event a user misplaced a key or forgot a passcode, the user generally could no longer access the device unless a spare key was available or a second user shared the passcode (which presents security issues) and was able to provide it to the first user. According to various aspects of the present disclosure, the present system and methods eliminate the need for physical and distributed access mechanisms thus obviating the security risks and risks of losing or misplacing the access key.

In particular embodiments, the smart cam lock system includes a lock body for housing one or more components of the smart cam lock system. In certain embodiments, the lock body includes a rotating grip for ease of handling when manually turning the lock body to lock and unlock the smart cam lock. In some embodiments, the smart cam lock includes a latch arm (e.g., lock arm, cam, etc.) for securely engaging with a rigid structure to facilitate a locked state. In particular embodiments, the smart cam lock includes a motor connected to the latch arm (e.g., cam) for facilitating engagement and disengagement of the latch arm (e.g., cam) by allowing it to rotate (e.g., manually or automatically).

In various embodiments, the smart key lock box system includes a lock housing connected to the lock body. In particular embodiments, the lock housing provides a protected enclosure for storing items within the smart key lock box. In some embodiments, the lock housing includes a solar panel for generating energy for the smart key lock box.

In various embodiments, embodiments of the smart cam lock and smart key lock box system include a control unit. In various embodiments, the control unit includes, among potential other components, an input means, an input means actuator, a battery, a USB port, a speaker, a LED, a global positioning system ("GPS"), a wireless communication technology, a connector, and an encryption chip. Generally, the input means allows users to provide authentication information to the system. In at least one embodiment, the input means is a barcode scanner. In these embodiments (and others), the input means allows users to scan packages for delivery verification purposes. In particular embodiments, users may authenticate using a barcode or other suitable machine-readable data (e.g., QR code). In particular embodiments, users may obtain a barcode from a central management system (as will be further discussed herein). In some embodiments, users may obtain a barcode from the smart cam lock or smart key lock box owner or administrator. In certain embodiments, users may display the barcode on a mobile device (e.g., smartphone, tablet computer, etc.). In one or more embodiments, the barcode may be displayed on a physical device (e.g., a key tag). In one or more embodiments, the input means may be manufactured to support any method of authentication (e.g., Near Field Communication (NFC) reader, fingerprint scanner, facial recognition, microphone, etc.). In one embodiment, the input means actuator includes a button to turn the input means on or off. In at least one embodiment, the button is located on the lock body of the smart cam lock or the lock housing of the smart key lock box.

In particular embodiments, the battery provides a power source for the control unit. In at least one embodiment, the battery provides a power source for the control unit, the lock housing, and the lock body. In various embodiments, the battery stores the power generated by a solar panel on the smart key lock box. In some embodiments, the universal serial bus (USB) port provides a mechanism for charging the battery and for sending instructions or software updates to the control unit. In one embodiment, the speaker gives audible feedback to users. In some embodiments, the GPS provides real-time tracking of the control unit's location.

Additionally, in various embodiments, the wireless communication technology provides mobile and long distance connectivity (e.g., Bluetooth, LTE-M, 3G, 4G, 5G, LoRa, Amazon Sidewalk, etc.). In certain embodiments, the wireless communication technology may provide mobile and long distance connectivity via any wireless network. In at least one embodiment, the GPS, Bluetooth, long distance connectivity, USB port, speaker, LED, and the connector are all connected to a circuit board. Furthermore, in various embodiments, the connector and encryption chip permit the secure transfer of power and data between the control unit and the lock housing unit.

Additionally, in various embodiments, the smart cam lock and smart key lock box systems further include a central management system. In particular embodiments, the central management system is an online system for managing the smart cam lock and smart key lock box systems as well as other access control systems (e.g., transportation and/or route management systems, enterprise resource planning systems, human resource systems, etc.). In some embodiments, the central management system provides a mechanism for maintaining an inventory of smart cam locks, smart key lock boxes, and control units. In at least one embodiment, the central management system provides a mechanism for managing users and access permissions to smart cam locks and smart key lock boxes. In certain embodiments, the central management system may employ blockchain technology to provide access, chain of custody and/or inventory management.

In one non-limiting embodiment, the present devices, systems, apparatuses, and methods are designed to facilitate digital lock management in situations where an organization or an individual may have a significant number of locations that need to be secured and, in the case of the organization, a smaller distributed workforce that needs to access those secured locations. For example, a real estate listing agent may employ the smart key lock box to protect a physical key to a property the agent is listing. Alternatively, the real estate agent may install the smart cam lock on the front door of the listed property if the use of a physical key is not desirable. In either example, the real estate agent may grant access to the property by sharing a barcode or QR code (or other machine-readable data) to users whom the agent authorizes. Rather than incur the risk, time, and expense of physical key management, the real estate agent employs the present devices, systems, apparatuses, and methods to digitize its lock management system and decrease the potential financial exposure in the event of a lost key.

In another example, the smart cam lock system may be used to facilitate package delivery. In this example, a user may install the smart cam lock in the keyhole of a container to facilitate opening and closing the container. Upon ordering a package and receiving a tracking number from the package delivery person, the user may program the smart cam lock with the tracking number such that the smart cam lock will unlock when the tracking number is input. In this example, the user may program the smart cam lock using management software associated with the smart cam lock. Continuing with this example, upon delivery of the ordered package, the mail courier may scan the barcode on the package using a built-in barcode scanner of the smart cam lock. In one embodiment, the barcode scanner is the same as the input means mentioned previously. If the tracking number associated with the scanned barcode matches the tracking number programmed to the smart cam lock, then the smart cam lock will open and the package can be placed in the container and re-locked The present disclosure is not limited to, and does not distinguish between any particular use cases of the smart cam lock or smart key lock box. In one embodiment, the smart cam lock and/or smart key lock box may be used for real estate purposes. In another embodiment, the smart cam lock and/or smart key lock box may be used for package delivery. In yet another embodiment, fleet management may necessitate the use of the smart cam lock and/or smart key lock box. As will be understood, virtually any application having a need for secure and scalable locking and unlocking of access to containers, utility boxes, buildings, entry points, etc. may apply the devices, systems, apparatuses, and methods described herein.

According to particular embodiments, an electronic cam lock, including: a cylindrical lock body encircled by a rotatable hand grip, wherein the rotatable hand grip is configured to rotate a cam rotatably affixed to a rear of the cylindrical lock body, wherein the cylindrical lock body further includes an internal cavity and a front surface; a scannable media scanner embedded within the internal cavity of the cylindrical lock body and at least partially exposed out of the front surface of the cylindrical lock body, the scannable media scanner being configured to read scannable media that is external to the cylindrical lock body; an actuation button disposed on the front surface of the cylindrical lock body and operatively connected to the scannable media scanner, wherein the actuation button is configured to actuate the scannable media scanner when pressed; and a power supply operatively connected to the barcode scanner and the actuation button.

In particular embodiments, the electronic cam lock herein, wherein the scannable media includes a bar code or QR code. In at least one embodiment, the electronic cam lock herein, further including an accelerometer operatively connected to the cylindrical lock body and configured to detect movement of the cylindrical lock body. In some embodiments, the electronic cam lock herein, wherein movement detected by the accelerometer is compared to one or more predefined rules corresponding to acceptable movement of the cylindrical lock body, and upon determination that the movement exceeds one or more movement thresholds, taking a predetermined action by a processor operatively connected to the accelerometer. According to one or more embodiments, the electronic cam lock herein, wherein the predetermined action is selected from the group including: transmitting a communication to an external system indicating unacceptable movement of the cylindrical lock body, preventing rotating of the rotatable hand grip and movement of the cam, logging the movement. According to some embodiments, the electronic cam lock herein, further including a global positioning system (GPS) embedded within the interval cavity of the cylindrical lock body or operatively connected to the cylindrical lock body and configured to identify a location of the cam lock. In various embodiments, the electronic cam lock herein, further including WiFi or cellular connectivity embedded within the cylindrical lock body. In various embodiments, the electronic cam lock herein, further including an annular antenna that at least partially encircles an interior of the cylindrical lock body to enable the WiFi or cellular connectivity. In particular embodiments, the electronic cam lock herein, further including an RFID reader operatively connected to the cylindrical lock body and configured to read RFID tags affixed to objects external to the cylindrical lock body. In certain embodiments, the electronic cam lock herein, wherein the internal circumference of the rotatable hand grip includes gear teeth configured to rotate gears operatively connected to the cam. In at least one embodiment, the electronic cam lock herein, wherein an outer circumference of the rotatable hand grip includes a plurality of grippable indentions. In some embodiments, the electronic cam lock herein, further including a temperature sensor operatively connected to the cylindrical lock body and configured to read a temperature of an object receptacle affixed to the cylindrical lock body and transmit the temperature to a remote system. In one or more embodiments, the electronic cam lock herein, wherein the temperature sensor is configured to read an object temperature emitted from a temperature emitter associated with an object to be placed in the object receptacle affixed to the cylindrical lock body and, if the object temperature meets or exceeds a predetermined threshold, initiate a notification to the remote system. In some embodiments, the electronic cam lock herein, further including a USB interface embedded within the cylindrical lock body. In particular embodiments, the electronic cam lock herein, further including a motor operatively connected to the cam and figured to automatically rotate the cam.

According to various embodiments, an electronic cam lock system, including: a cylindrical lock body encircled by a rotatable hand grip, wherein the rotatable hand grip is configured to rotate a cam rotatably affixed to the cylindrical lock body; a scannable media scanner embedded within the cylindrical lock body and at least partially exposed out of a surface of the cylindrical lock body, the scannable media scanner being configured to read scannable media that is external to the cylindrical lock body; a local storage operatively connected to the cylindrical lock body; and a processor operatively connected to the cylindrical lock body, the scannable media scanner, and the local storage, the processor being operative to: receive a plurality of datasets corresponding to a plurality of temporary scannable media files from a remote system, wherein at least one of the temporary scannable media files corresponds to a package expected to be delivered to an address associated with the electronic cam lock system; store the plurality of datasets in the local storage; read a particular scannable media file presented at the electronic cam lock system via the scannable media scanner; extract data from the particular scannable media file and compare the extracted data to the plurality of datasets corresponding to the plurality of temporary scannable media files in the local storage; and upon determination that the extracted data matches at least one of the plurality of datasets, unlock the cam by enabling rotation of the rotatable hand grip.

In particular embodiments, the electronic cam lock herein, wherein prior to reading the particular scannable media file presented at the electronic cam lock system, the processor is further operative to: determine that a predetermined time period has passed; delete the plurality of datasets corresponding to the plurality of temporary scannable media files; receive a new plurality of datasets corresponding to a new plurality of temporary scannable media files from the remote system, wherein at least one of the new temporary scannable media files corresponds to the package expected to be delivered to the address associated with the electronic cam lock system; and store the new plurality of datasets in the local storage for subsequent comparison to the particular scannable media file. In one or more embodiments, the electronic cam lock herein, wherein the scannable media files include barcodes or QR codes. In certain embodiments, the electronic cam lock herein, further including an accelerometer operatively connected to the cylindrical lock body and the processor, and configured to detect movement of the cylindrical lock body. In at least one embodiment, the electronic cam lock herein, wherein the processor is further operative to: receive an indication from the accelerometer that movement of the cylindrical lock body is detected; retrieve one or more predefined rules from the local storage, wherein the one or more predefined rules correspond to acceptable movement of the cylindrical lock body; compare the movement of the cylindrical lock body detected by the accelerometer to the one or more predefined rules; and upon determination that the movement exceeds one or more movement thresholds defined by the one or more predefined rules, initiate a predetermined action. In some embodiments, the electronic cam lock herein, further including a global positioning system (GPS) operatively connected to the cylindrical lock body and configured to identify a location of the cylindrical lock body. According to various embodiments, the electronic cam lock herein, further including WiFi or cellular connectivity embedded within the cylindrical lock body. In certain embodiments, the electronic cam lock herein, further including an annular antenna that at least partially encircles an interior of the cylindrical lock body to enable the WiFi or cellular connectivity. In particular embodiments, the electronic cam lock herein, further including an RFID reader operatively connected to the cylindrical lock body and configured to read RFID tags affixed to objects external to the cylindrical lock body. In at least one embodiment, the electronic cam lock herein, wherein the internal circumference of the rotatable hand grip includes gear teeth configured to rotate gears operatively connected to the cam. In particular embodiments, the electronic cam lock herein, wherein an outer circumference of the rotatable hand grip includes a plurality of grippable indentions. In various embodiments, the electronic cam lock herein, further including a temperature sensor operatively connected to the cylindrical lock body and configured to read a temperature of an object receptacle affixed to the cylindrical lock body. In certain embodiments, the electronic cam lock herein, wherein the temperature sensor is configured to read an object temperature emitted from a temperature emitter associated with an object to be placed in the object receptacle affixed to the cylindrical lock body and, if the object temperature meets or exceeds a predetermined threshold, initiate a notification by the processor to the remote system.

These and other aspects, features, and benefits of the claimed technology will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 19 illustrates an exemplary lock opening process, according to one embodiment of the present disclosure.

DETAILED DESCRIPTION

Figure 1:
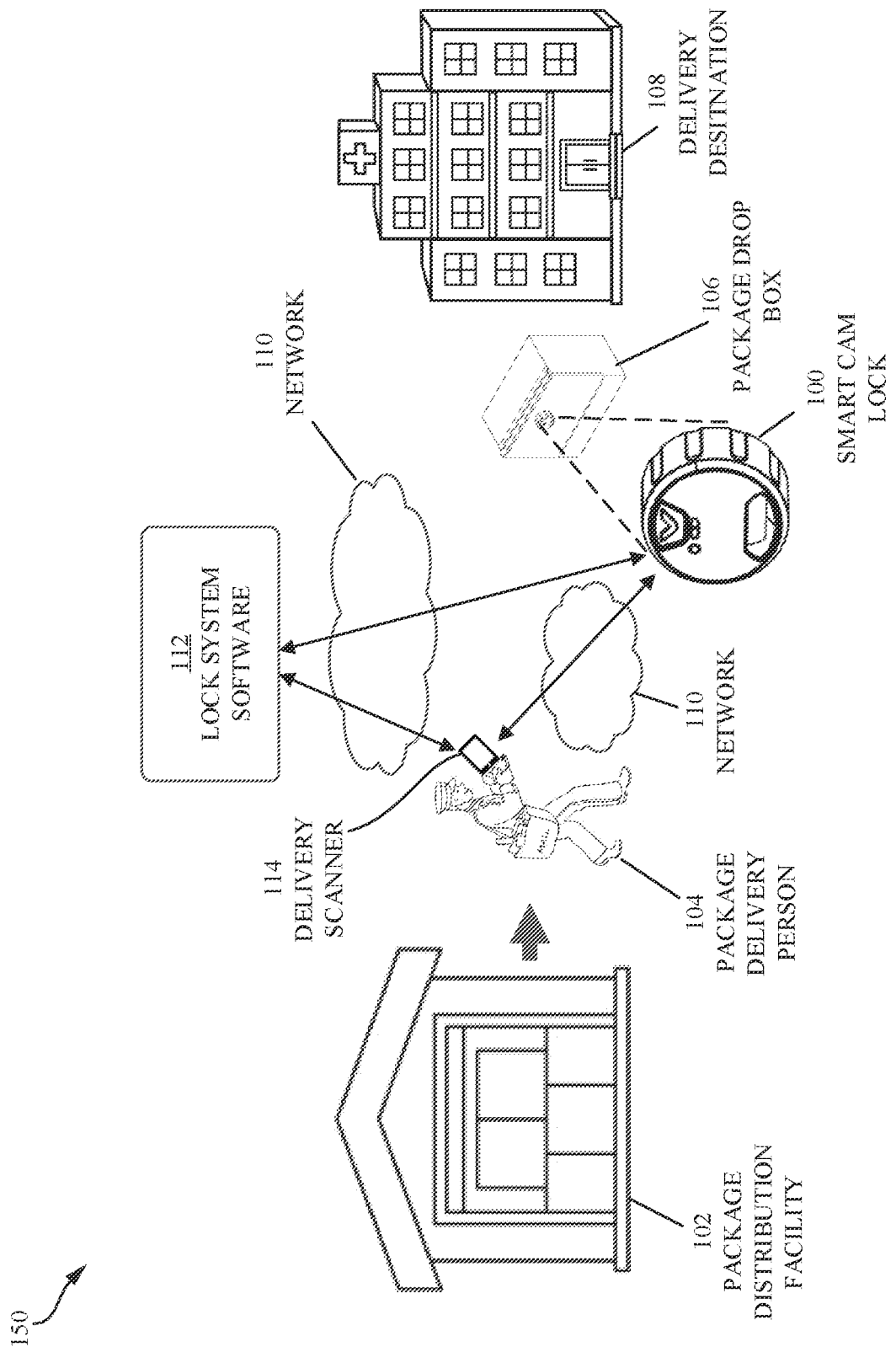
FIG. 1 illustrates an exemplary system environment, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Briefly described and according to one embodiment, aspects of the present disclosure generally relate to devices, systems, apparatuses, and methods for a smart cam lock and a smart key lock box. A need arises where an organization or an individual may desire access to a cam lock or lock box without requiring physical keys or distribution of a passcode. The organization seeks to digitalize its lock management system to minimize the risk, time, and expense of physical key management. Accordingly, by implementing use of a smart cam lock and/or smart key lock box as described herein, the organization or individual may increase security of their locked devices, while decreasing their potential financial exposure in the event of a lost key or passcode. In one aspect, a smart cam lock is disclosed. In another aspect, a smart key lock box is disclosed. In these (and other) aspects, the smart cam lock and/or key lock box may be associated with a digitally stored tracking number. A user desiring access to the smart cam lock and/or smart key lock box may input a tracking number into the smart cam lock and/or smart key lock box (e.g., via a barcode scanner), such that the user is granted access if the inputted tracking number matches the digitally stored tracking number associated with the smart cam lock and/or smart key lock box.

The above and further features of the disclosed exemplary smart cam lock and smart key lock box systems will be recognized from the following detailed descriptions and drawings of particular embodiments. In various embodiments, the smart key lock box system includes a lock housing. In particular embodiments, the lock housing provides a protected enclosure for storing items within the smart key lock box. In some embodiments, the lock housing includes a solar panel for generating energy for the smart key lock box.

In particular embodiments, the smart cam lock system includes a lock body for housing one or more components of the smart cam lock system. In certain embodiments, the lock body includes a rotating grip for ease of handling when manually turning the lock body to lock and unlock the smart cam lock. In some embodiments, the smart cam lock includes a latch arm (e.g., lock arm, cam, etc.) for securely engaging with a rigid structure to facilitate a locked state. In particular embodiments, the smart cam lock includes a motor connected to the latch arm (e.g., cam) for facilitating engagement and disengagement of the latch arm (e.g., cam) by allowing it to rotate (e.g., manually or automatically).

In various embodiments, embodiments of the smart cam lock system and smart key lock box system include a control unit. In various embodiments, the control unit includes, among potential other components, an input means, an input means actuator, a battery, a USB port, a speaker, a LED, a global positioning system ("GPS"), a wireless communication technology, a connector, and an encryption chip. Generally, the input means allows users to provide authentication information to the system. In at least one embodiment, the input means is a barcode scanner. In these embodiments (and others), users may authenticate using a barcode or other suitable machine-readable data (e.g., QR code). In particular embodiments, users may obtain a barcode from a central management system (as will be further discussed herein). In some embodiments, users may obtain a barcode from the smart cam lock or smart key lock box owner or administrator. In certain embodiments, users may display the barcode on a mobile device (e.g., smartphone, tablet computer, etc.). In one or more embodiments, the barcode may be displayed on a physical device (e.g., a key tag). In one or more embodiments, the input means may be manufactured to support any method of authentication (e.g., Near Field Communication (NFC) reader, fingerprint scanner, facial recognition, microphone, etc.). In one embodiment, the input means actuator includes a button to turn the input means on or off. In at least one embodiment, the button is located on the lock body of the smart cam lock or the lock housing of the smart key lock box.

In particular embodiments, the battery provides a power source for the control unit. In at least one embodiment, the battery provides a power source for the control unit, the lock housing, and the lock body. In various embodiments, the battery stores the power generated by a solar panel on the smart key lock box. In some embodiments, the universal serial bus (USB) port provides a mechanism for charging the battery and for sending instructions or software updates to the control unit. In one embodiment, the speaker gives audible feedback to users. In some embodiments, the GPS provides real-time tracking of the control unit's location. Additionally, in various embodiments, the wireless communication technology provides mobile and long distance connectivity (e.g., Bluetooth, LTE-M, 3G, 4G, 5G, LoRa, Amazon Sidewalk, etc.). In certain embodiments, the wireless communication technology may provide mobile and long distance connectivity via any wireless network. In at least one embodiment, the GPS, Bluetooth, long distance connectivity, USB port, speaker, LED, and the connector are all connected to a circuit board. Furthermore, in various embodiments, the connector and encryption chip permit the secure transfer of power and data between the control unit and the lock housing unit.

Additionally, in various embodiments, the smart cam lock and smart key lock box systems further include a central management system. In particular embodiments, the central management system is an online system for managing the smart cam lock and smart key lock box systems as well as other access control systems (e.g., transportation and/or route management systems, enterprise resource planning systems, human resource systems, etc.). In some embodiments, the central management system provides a mechanism for maintaining an inventory of smart cam locks, smart key lock boxes, and control units. In at least one embodiment, the central management system provides a mechanism for managing users and access permissions to smart cam locks and smart key lock boxes. In certain embodiments, the central management system may employ blockchain technology to provide access, chain of custody and/or inventory management.

In one non-limiting embodiment, the present devices, systems, apparatuses, and methods are designed to facilitate digital lock management in situations where an organization or an individual may have a significant number of locations that need to be secured and, in the case of the organization, a smaller distributed workforce that needs to access those secured locations. For example, a real estate listing agent may employ the smart key lock box to protect a physical key to a property the agent is listing. Alternatively, the real estate agent may install the smart cam lock on the front door of the listed property if the use of a physical key is not desirable. In either example, the real estate agent may grant access to the property by sharing a barcode or QR code (or other machine-readable data) to users whom the agent authorizes. Rather than incur the risk, time, and expense of physical key management, the real estate agent employs the present devices, systems, apparatuses, and methods to digitize its lock management system and decrease the potential financial exposure in the event of a lost key.

In another example, the smart cam lock system may be used to facilitate package delivery. In this example, a user may install the smart cam lock in the keyhole of a container to facilitate opening and closing the container. Upon ordering a package and receiving a tracking number from the package delivery person, the user may program the smart cam lock with the tracking number such that the smart cam lock will unlock when the tracking number is input. In this example, the user may program the smart cam lock using management software associated with the smart cam lock. Continuing with this example, upon delivery of the ordered package, the mail courier may scan the barcode on the package using the built-in barcode scanner on the bottom-side of the smart cam lock. If the tracking number associated with the scanned barcode matches the tracking number programmed to the smart cam lock, then the smart cam lock will open and the package can be placed in the container and re-locked The present disclosure is not limited to, and does not distinguish between any particular use cases of the smart cam lock or smart key lock box. In one embodiment, the smart cam lock and/or smart key lock box may be used for real estate purposes. In another embodiment, the smart cam lock and/or smart key lock box may be used for package delivery. In yet another embodiment, fleet management may necessitate the use of the smart cam lock and/or smart key lock box. As will be understood, virtually any application having a need for lock and key management may apply the devices, systems, apparatuses, and methods described herein.

Exemplary Embodiments

Referring now to the figures, for the purposes of example and explanation of the fundamental processes and components of the disclosed systems and methods, reference is made to FIG. 1, which illustrates an exemplary, high-level overview 150 of one embodiment of the systems and methods herein. As will be understood and appreciated, the exemplary, high-level overview 150 shown in FIG. 1 represents merely one approach or embodiment of the present system, and other aspects are used according to various embodiments of the present system. In particular, FIG. 1 depicts a particular example in which a package delivery person 104 retrieves his outbound deliveries (e.g., laboratory specimens, letters, packages, catalogs, etc.) from a package distribution facility 102 (e.g., a medical clinic, post office, etc.), and seeks to drop off mail at a delivery destination 108 (e.g., a reference laboratory) that employs a package drop box 106 secured with a smart cam lock 100. Further, FIG. 1 depicts how various systems in this environment interact in at least one embodiment of the systems and methods described herein.

As shown in FIG. 1, a package delivery person 104 approaches a delivery destination 108 (e.g., hospital) to drop off a package in a package drop box 106 secured with a smart cam lock 100. In some embodiments, the package may contain laboratory specimens or other various items. In various embodiments, the package originates at a package distribution facility 102 or other suitable package origination source (e.g., medical laboratory, post office, courier warehouse, etc.). In certain embodiments, prior to leaving the package distribution facility 102, the package delivery person 104 scans the packages with a delivery scanner 114 or other computing device (e.g., tablet computer, smartphone, etc.). In particular embodiments, the delivery scanner 114 may include and/or be linked to lock system software 112 for controlling, managing, and tracking packages (i.e., mail) and smart cam locks 100. Continuing with the example shown in FIG. 1, upon scanning the packages with the delivery scanner 114, the package status is updated in the lock system software 112 as "Out for Delivery" or other comparable status. Further, as shown, the various components of this exemplary environment are operatively connected via one or more networks 110.

In one embodiment, the network 110 may be, but is not limited to the Internet, and may involve the usage of one or more services (e.g., a Web-deployed service with client/service architecture, a corporate Local Area Network (LAN) or Wide Area Network (WAN), a cellular data network, or through a cloud-based system). Moreover, as will be understood and appreciated by one having ordinary skill in the art, various networking components like routers, switches, hosts, etc. are typically involved in these communications. Although not shown in FIG. 1, such communications may include, in various embodiments, one or more secure networks, gateways, or firewalls that provide additional security from unwarranted intrusions by unauthorized third parties and cyber-attacks.

Continuing with the example shown in FIG. 1, upon scanning the packages at the package distribution facility 102 with a delivery scanner 114, the packages (e.g., laboratory specimens) are sent out for delivery with the package delivery person 104 to be dropped off in the package drop box 106 at the delivery destination 108 (e.g., hospital). In particular embodiments, upon arriving at the package drop box 106 of the delivery destination 108, the package delivery person 104 may encounter a smart cam lock 100 securing the package drop box 106 to prevent unauthorized entry. In various embodiments, and as will be further discussed herein, the smart cam lock 100 may include a barcode scanner to facilitate access verification by scanning a barcode or other implement on a label, which may include or allow identification of tracking numbers and/or other verifiable data (e.g., origination information, sender/recipient information, etc.). To unlock the smart cam lock 100 and open the package drop box 106, the package delivery person 104 scans the package with the smart cam lock's 100 barcode scanner. Prior to unlocking the package drop box 106, in this particular example, the lock system software 112 may contain a record that matches, or otherwise links, the package to be delivered with the smart cam lock 100 securing the package drop box 106 located at the delivery destination 108 (e.g., hospital). In various embodiments, and in the current example, when a package delivery person 104 scans the package with the barcode scanner of the smart cam lock 100, the smart cam lock 100 sends the tracking number of the package (and location data of the smart cam lock 100) to the lock system software 112 (e.g., via WiFi, cellular networks, etc.), such that delivery of the package may be verified by matching the tracking number and location data transmitted with the record of expected delivery stored via the lock system software 112. In some embodiments, prior to instructing the smart cam lock 100 to open, the lock system software 112 checks the status of the package to verify that the package status is "Out for Delivery" or other similar status. In particular embodiments, upon verification, the smart cam lock 100 may be unlocked by rotating the cam lock in a first direction (e.g., either clockwise or counter-clockwise). The package delivery person 112, in the current example, may then place the package in the package drop box 106 and re-lock it by rotating the smart cam lock 100 in the opposite direction, such that the owner of the package drop box 106 may access the package at a later time.

As will be understood from the discussions herein, the above particular example is merely exemplary functionality of the systems and methods described herein. For example, the above describes a package delivery person delivering a package (e.g., laboratory specimens) from a package distribution facility to a particular package destination (e.g., hospital), but the systems, apparatuses and methods herein may be useful for any use in connection with securing items to prevent tampering by unauthorized parties. For example, in an alternate embodiment, the package delivery person may seek to retrieve packages (e.g., laboratory specimens, mail, etc.) from the package drop box as opposed to delivering packages. In these embodiments (and others), the package delivery person may unlock the smart cam lock by scanning a machine-readable employee ID, a mobile device displaying machine-readable data, or by providing other suitable authentication means. Continuing with this example, upon unlocking the smart cam lock and retrieving the package (e.g., laboratory specimens, mail, etc.), the package delivery person may then deliver the package to a delivery destination (e.g., reference laboratory, package distribution facility, etc.).

Figure 2:
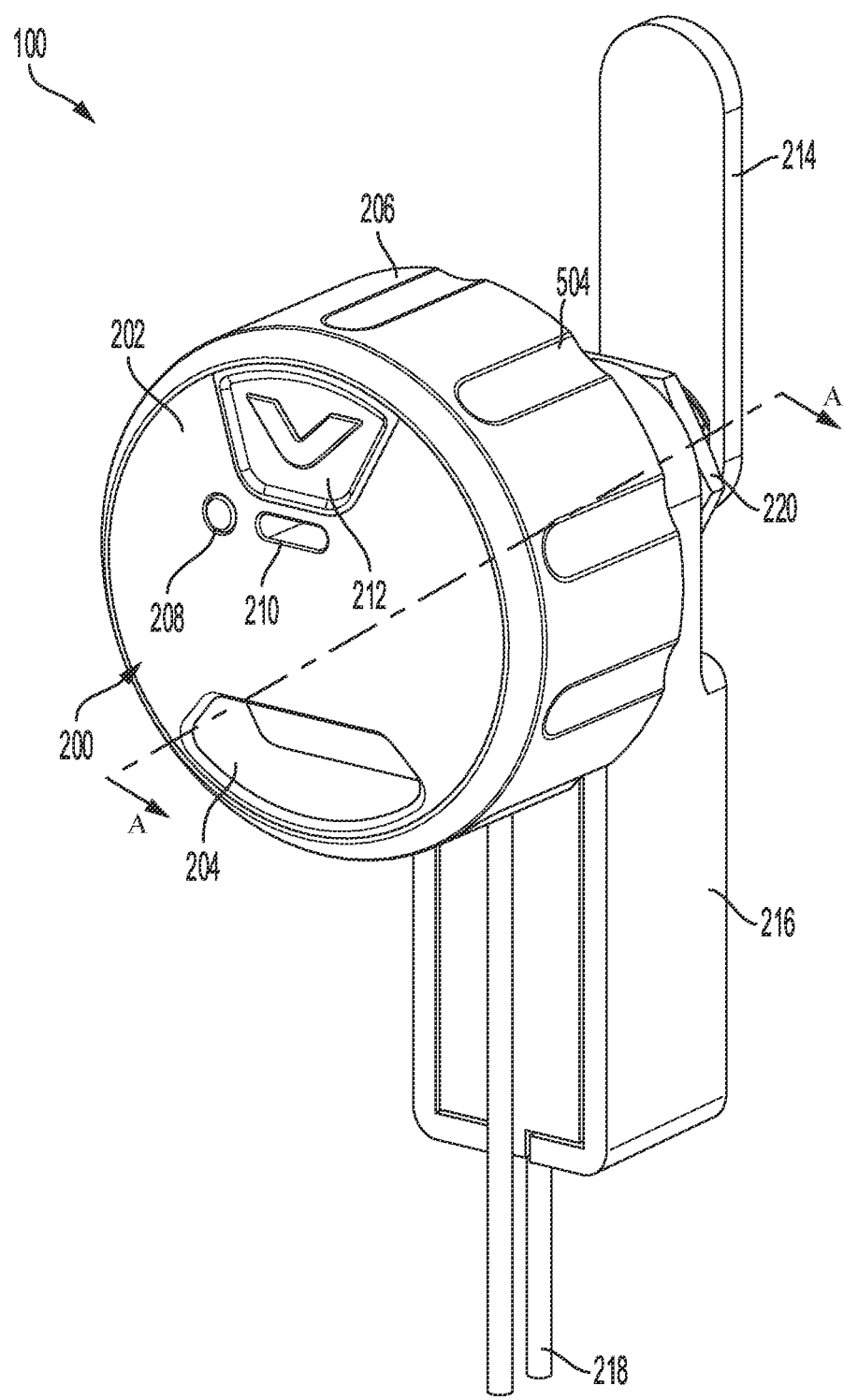
FIG. 2 illustrates a perspective view of an exemplary smart cam lock, according to one embodiment of the present disclosure.

Turning now to FIG. 2, a perspective view of an exemplary smart cam lock 100 is shown, according to one embodiment of the present disclosure. In particular embodiments, the smart cam lock 100 may be used in place of a standard (e.g., keyhole) lock. In one or more embodiments, and as shown in FIG. 1, the smart cam lock 100 may be used to securely lock a package drop box 106. In certain embodiments, the smart cam lock 100 may be used to lock a variety of items, including but not limited to: doors, drawers, containers, chests, utility boxes, luggage, file cabinets, lockers, medical drop boxes, etc.).

According to various aspects of the present disclosure, the smart cam lock 100 may include a lock body 200 for providing a secure exterior shell for housing the internal smart cam lock 100 components, as discussed in U.S. patent application Ser. No. 16/220,527, filed on Dec. 14, 2018, and entitled "Lock Apparatuses and Methods," incorporated herein by reference in its entirety. In some embodiments, the lock body 200 may be any suitable shape (e.g., rectangular, triangular, square, etc.). In the embodiment shown in FIG. 2, the lock body 200 is substantially circular. In some embodiments, the lock body 200 may be manufactured from plastic, metal, steel, carbide or any other suitable material. In various embodiments, the lock body 200 may include a rubber grip 206 substantially surrounding the outer surface of the lock body 200 to facilitate holding and rotating the smart cam lock 100 (e.g., to lock and unlock the smart cam lock 100). In various embodiments, the rubber grip 206 is manufactured from rubber, plastic, silicone, vinyl, neoprene, or any other suitable material. In certain embodiments, the rubber grip 206 may include one or more indentations 504 on the surface of the rubber grip 206 to facilitate holding and rotating the smart cam lock 100.

In certain embodiments, the lock body 200 may include a front surface 202 upon where various user interfaces may be connected. In these embodiments (and others), the front surface 202 may include a cable port 210 for connecting the smart cam lock 100 to an exterior power source. In particular embodiments, the cable port 210 may provide for connection to one or more third-party systems (e.g., computers, smart phones, tablets, etc.). In some embodiments, the cable port 210 may accept USB cables. In these embodiments (and others), the cable port 210 may accept USB-A, USB-B, USB-C, micro-USB, mini-USB, USB 3.0, or any other suitable cable (e.g., RCA, HDMI, Ethernet, etc.).

In at least one embodiment, the front surface 202 may include an LED indicator 208 to identify one or more statuses of the smart cam lock 100 (e.g., locked, unlocked, charging, connected, on, off, ready, busy, etc.). In particular embodiments, the light status of the LED indicator 208 may indicate that the status of the battery (e.g., charged, charging, needs charging, etc.). In certain embodiments, the LED indicator 208 may be any suitable color (e.g., green, red, orange, blue, yellow, purple, etc.). In one embodiment, the LED indicator 208 may change colors depending on the status of the lock. In some embodiments, the LED indicator 208 may include more than one bulb. In various embodiments, the LED indicator 208 may help guide users as to what direction to turn the smart cam lock 100 when locking or unlocking the smart cam lock. In at least one embodiment, the LED indicator 208 may also indicate the status of the scan (e.g., successful or unsuccessful). In some embodiments (not shown), the smart cam lock 100 may include dual, substantially triangular-shaped, multicolored lights to indicate the status of the smart cam lock. In one non-limiting example, if both lights are off, it indicates that the smart cam lock is in standby and ready to scan. If both lights are white and pulsating, this may indicate that the smart cam lock 100 is currently processing or downloading data (e.g., updating firmware). Continuing with this example, if both lights are green, this indicates that the smart cam lock 100 successfully completed a scan. If both lights are red, then this indicates that the scan was unsuccessful. Further, in this example, a single green light may indicate that the smart cam lock 100 is in a locked state, while a single red light indicates that the smart cam lock 100 in an unlocked state. As will be understood and appreciated, virtually any light or other indicator can be used to demonstrate various states of the smart cam locks 100 described herein.

In at least one embodiment, the front surface 202 includes an input means 204 for authentication purposes. In various embodiments, the input means 204 may include, but is not limited to: a barcode scanner, fingerprint scanner, NFC reader, camera, microphone, keypad, number pad, or any other suitable input. In at least one embodiment, the front surface 202 may include more than one input means 204. In at least one embodiment, the input means 204 is recessed to protect it from damage and exposure to possibly harmful contact (e.g., with water). In some embodiments, the input means 204 may be angled downwards to facilitate scanning a package or label positioned below the smart cam lock 100. In one embodiment, the input means may include sensors that activate the input means 204 when an object comes into a field of view of the smart cam lock 100. In the embodiment shown in FIG. 2, the input means 204 is a barcode scanner. In various embodiments, the barcode scanner (e.g., input means 204) may facilitate authentication of a smart cam lock 100 user by scanning a barcode, and converting the barcode information into an access key as will be further described herein. In one or more embodiments, the access key may be used to grant or deny a user permission to open the smart cam lock 100 as will also be further described herein.

In one or more embodiments, the front surface 202 of the exemplary smart cam lock 100 may also include an activation button 212. In these embodiments (and others), the activation button 212 may be used to toggle the input means 204 on or off. As shown, the activation button may be triangular shaped, arrow shaped, or have some other shape so as to signal to a lock user that the button has functionality and should be pressed. In some embodiments, the button 212 may be made of a rubber, neoprene, or other elastomer material to enable preferable tactile engagement. Some embodiments of the cam lock 100 may have no activation button 212 at all, and instead include sensors that activate the input means 204 when an object comes into a field of view of the lock. In other embodiments, the activation button 212 may be on a side or different location of the cam lock as desired by manufacturers.

Continuing with the embodiment shown in FIG. 2, the exemplary smart cam lock 100 may include a lock arm 214 (e.g., cam) for engaging and disengaging with a rigid structure (e.g., of a container, mailbox or other device equipped with the smart cam lock 100 (e.g., "equipped device")), such that the equipped device cannot be opened when the lock arm 214 is engaged with the rigid structure. In particular embodiments, the lock arm 214 is operatively connected to the back side of the smart cam lock 100 (via the motor housing 216), such that the lock arm 214 rotates concurrently with the rotation of the rubber grip 206 of the smart cam lock 100. In certain embodiments, the lock arm 214 is connected to the back of the smart cam lock 100 via a connection mechanism 220 (e.g., a bolt with nut and washer) to facilitate rotation of the lock arm 214. In particular embodiments, when the lock arm 214 is rotated to a vertical position (e.g., 180 degrees relative to the ground), then the lock arm 214 is engaged with the rigid structure such that the equipped device is prevented from opening (e.g., the device is locked). In one or more embodiments, when the lock arm 214 is rotated to a horizontal position (e.g., 90 degrees relative to the ground), then the lock arm 214 is disengaged with the rigid structure such that the equipped device is unlocked and allowed to open. In at least one embodiment, the equipped device may unlock when the lock arm 214 is positioned at various angles relative to the ground (e.g., 115 degrees, 150 degrees, etc.). In some embodiments, the lock arm 214 may be manufactured from plastic, metal, steel, carbide or any other suitable material.

Connected to the lock arm 214, in particular embodiments, is motor housing 216 for providing housing and protection for the smart cam lock 100 motor (not shown). In particular embodiments, the motor housing 216 is substantially cuboid in shape but may be any suitable shape. In one or more embodiments, the motor housing 216 may be manufactured from plastic, metal, steel, carbide or any other suitable material. In at least one embodiment, the exemplary smart cam lock 100 may include one or more cables 218 that extend below the bottom of the motor housing 216 to facilitate connection of the smart cam lock 100 to a battery or other power source.

Figure 3:
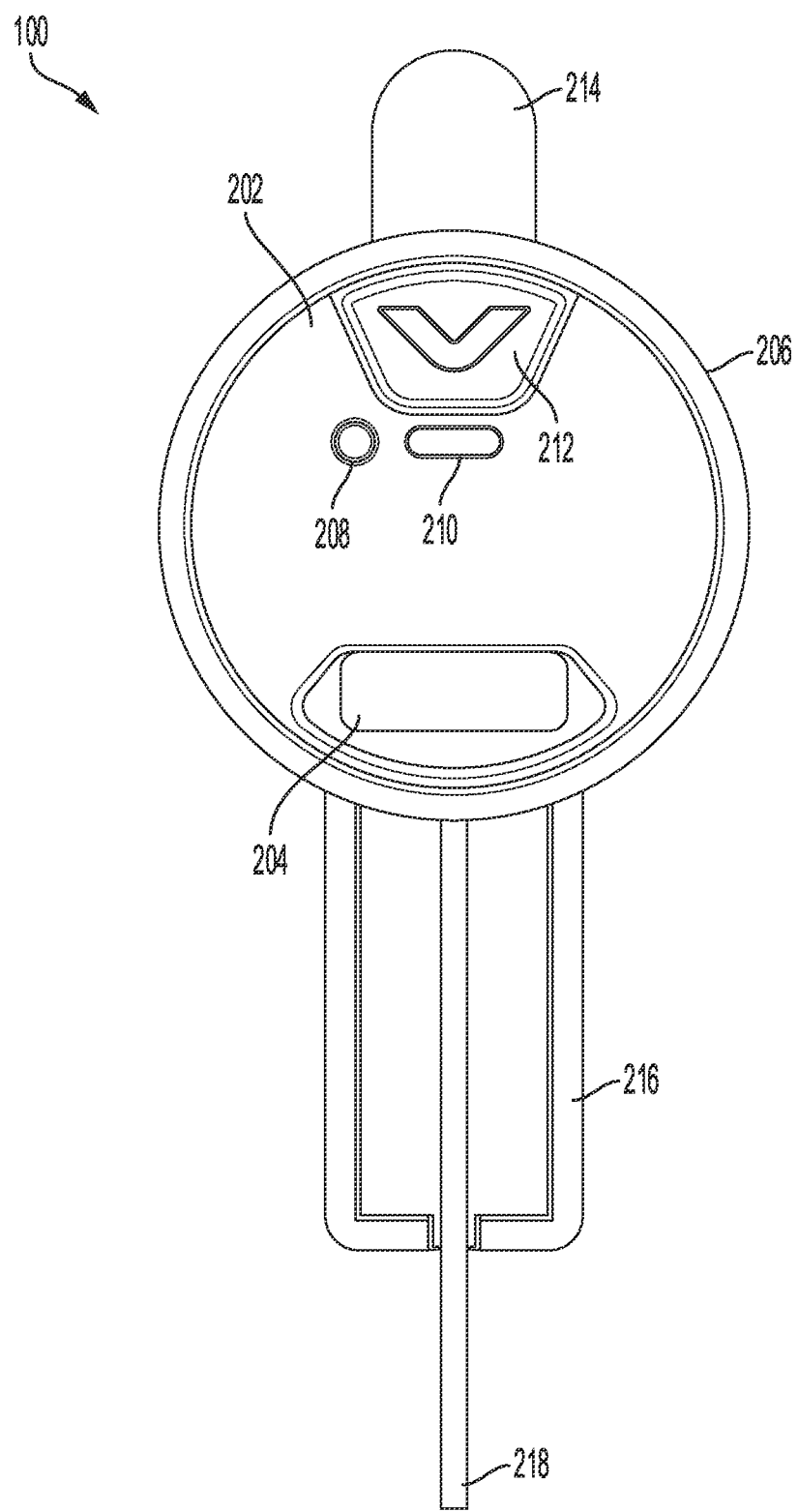
FIG. 3 illustrates a front view of an exemplary smart cam lock, according to one embodiment of the present disclosure.

Turning now to FIG. 3, a front view of an exemplary smart cam lock 100 is shown, according to one embodiment of the present disclosure. In various embodiments, the diameter of the exemplary smart cam lock 100 (including the rubber grip 206) may be approximately 60 mm (e.g., between 50 mm and 70 mm). As will be understood and appreciated, virtually any dimensions and sizes may be used with aspects of the present devices.

Figure 4:
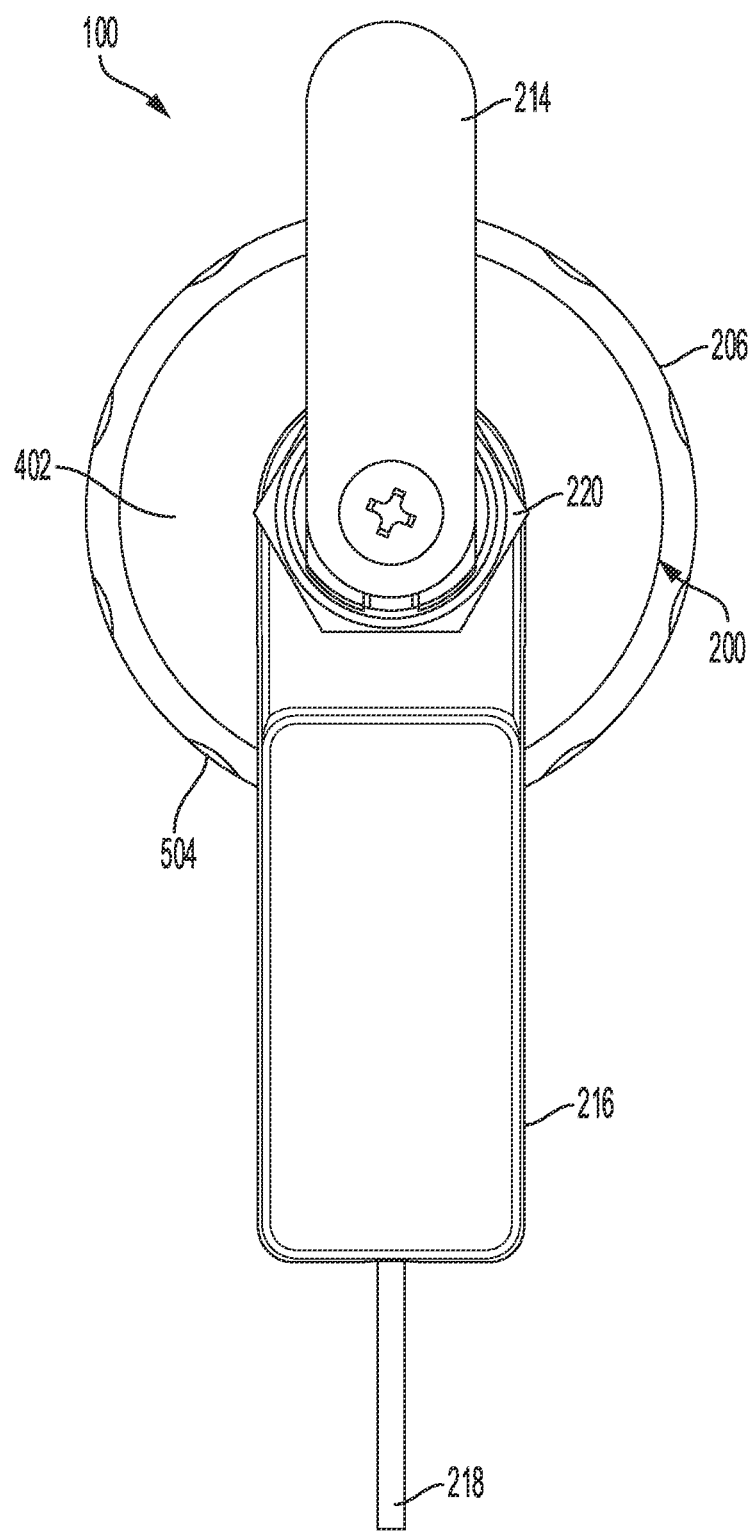
FIG. 4 illustrates a rear view of an exemplary smart cam lock, according to one embodiment of the present disclosure.

FIG. 4 shows a rear view of an exemplary smart cam lock 100, according to one embodiment of the present disclosure. In particular embodiments, the lock body 200 may include a back housing seal 402 for facilitating connection to the motor housing 216 and lock arm 214. In certain embodiments, and as shown in FIG. 4, the smart cam lock 100 includes a rubber grip 206 with one or more indentations 504 on the surface of the rubber grip 206. In particular embodiments, the one or more indentations 504 provide grooves along the surface of the rubber grip 206 that allows a user's fingers to more easily manipulate the smart cam lock 100 when locking and unlocking it.

Figure 5:
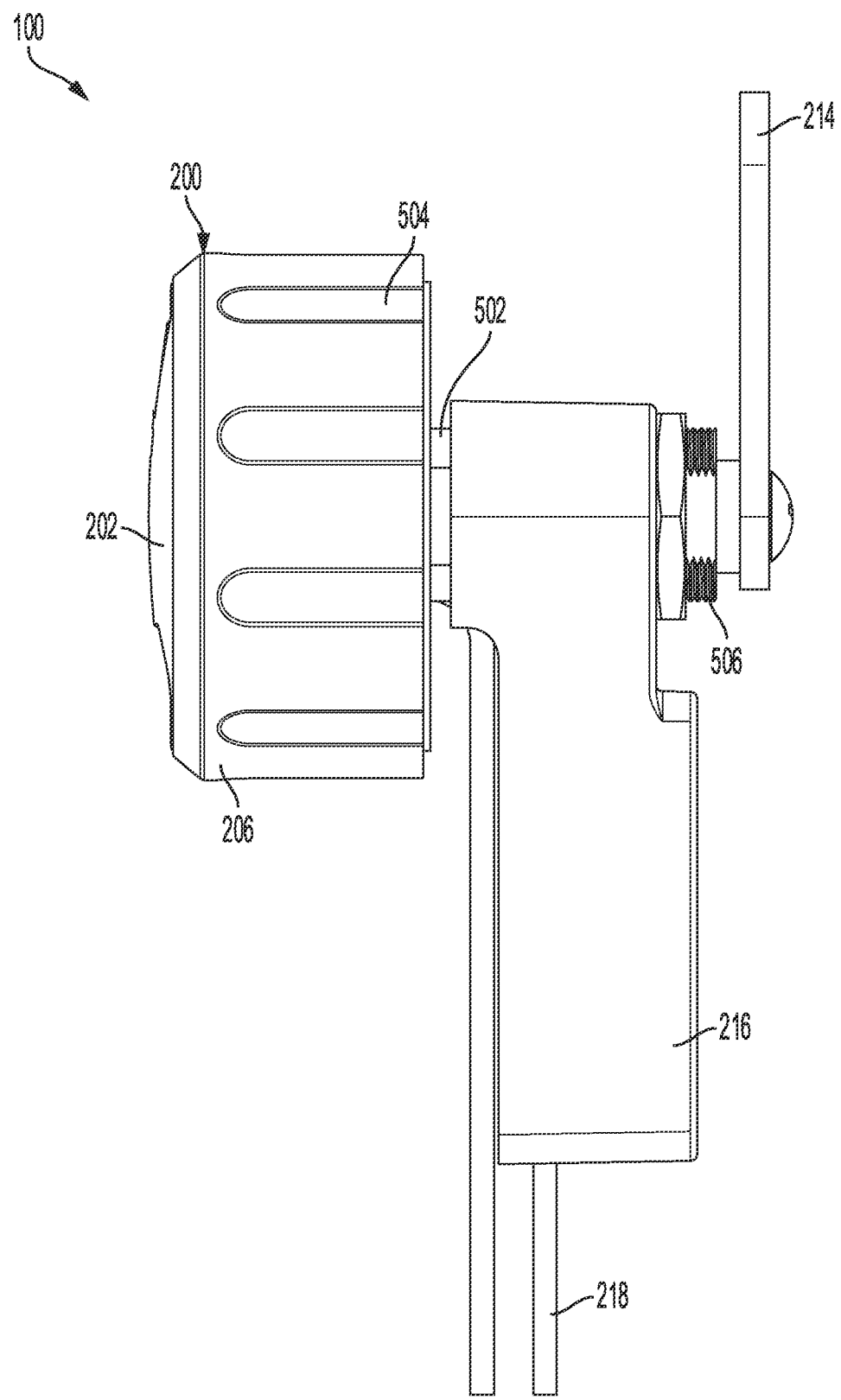
FIG. 5 illustrates a side view of an exemplary smart cam lock, according to one embodiment of the present disclosure.

Now referring to FIG. 5, a side view of an exemplary smart cam lock 100 is shown, according to one embodiment of the present disclosure. In particular embodiments, the front surface 202 of the smart cam lock 100 may be slightly rounded whereby it protrudes outward from the vertical plane of the lock body 200. In at least one embodiment, the rubber grip 206 may include one or more indentations 504 to facilitate holding the smart cam lock 100. In one or more embodiments, the indentations 504 may be substantially u-shaped. In some embodiments, the indentations 504 may be substantially rectangular-shaped, obround-shaped, or any other suitable shape. In at least one embodiment, the one or more indentations 504 are equidistant apart. In some embodiments, the distance between each indentation 504 may vary.

Figure 6:
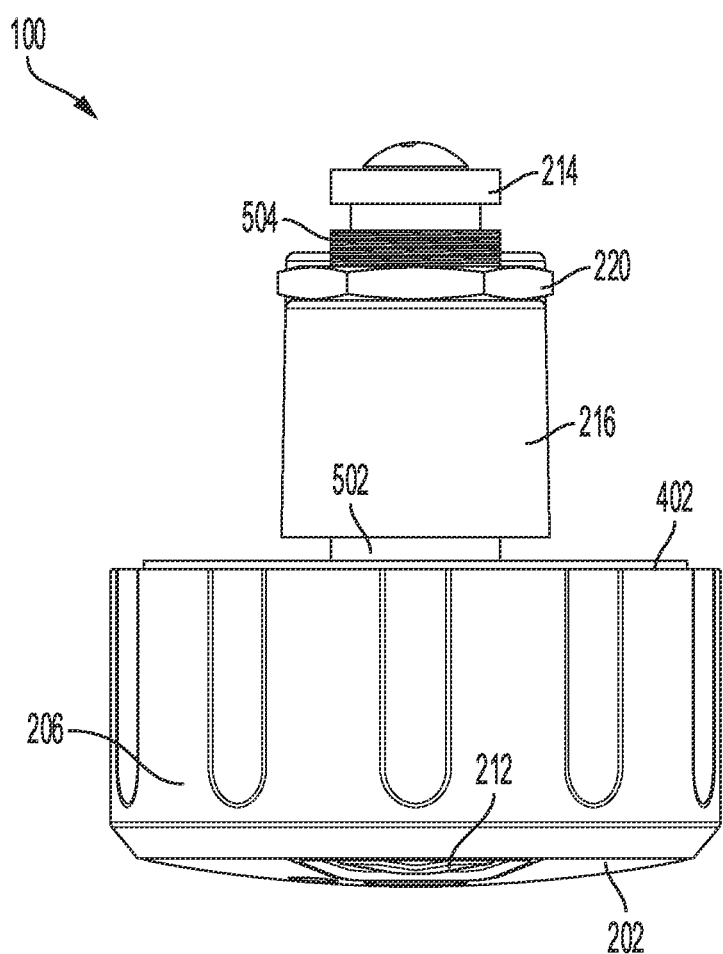
FIG. 6 illustrates a top view of an exemplary smart cam lock, according to one embodiment of the present disclosure.
Figure 7:
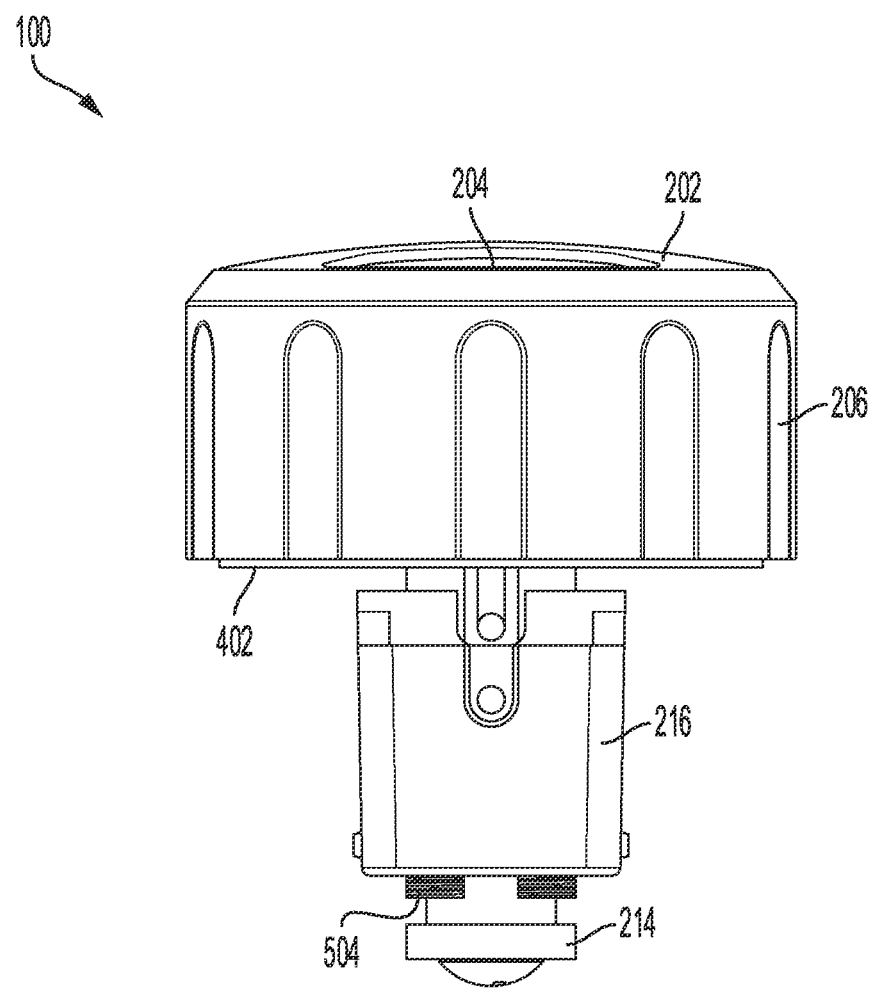
FIG. 7 illustrates a bottom view of an exemplary smart cam lock, according to one embodiment of the present disclosure.

FIGS. 6 and 7 show the top and bottom views, respectively, of an exemplary smart cam lock 100, according to one embodiment of the present disclosure. In one or more embodiments, the width of the rubber grip 206 may be approximately 15 mm (e.g., between 10 mm and 50 mm). As will be understood and appreciated, virtually any dimensions and sizes may be used with aspects of the present devices.

Figure 8:
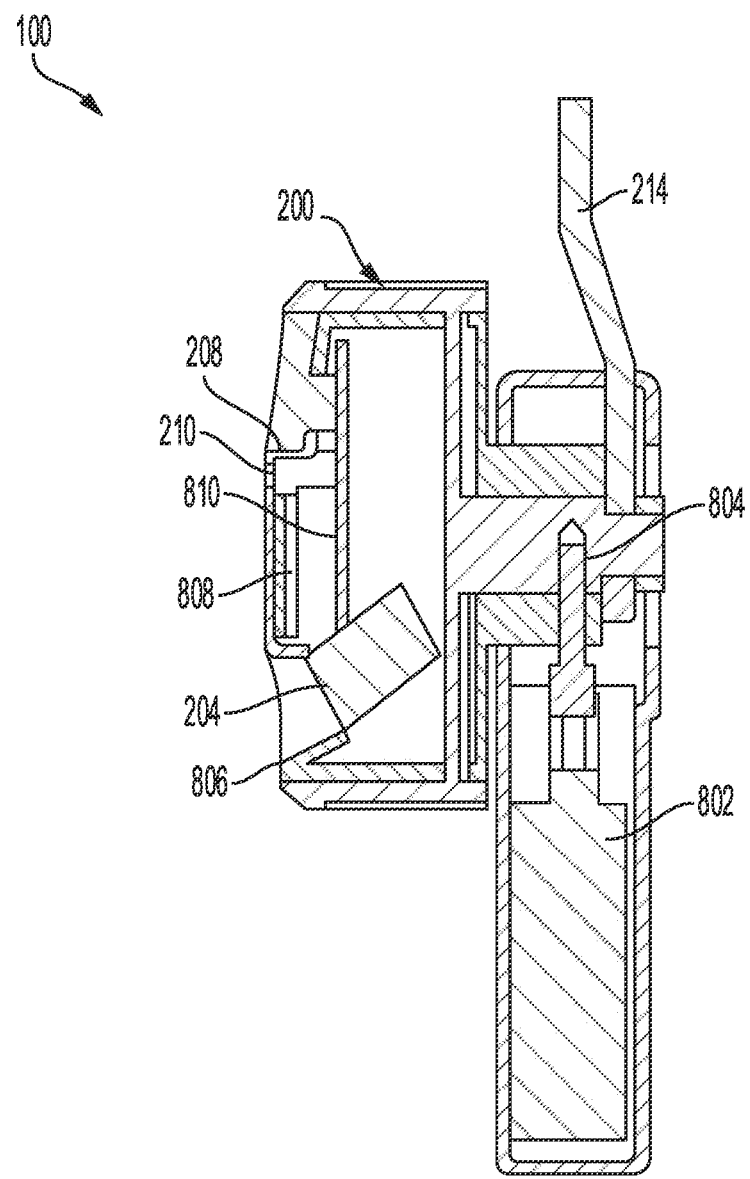
FIG. 8 illustrates a cross-sectional view of an exemplary smart cam lock, according to one embodiment of the present disclosure.

Referring now to FIG. 8, a cross section taken through the lock body 200, lock arm 214 (e.g., cam), and motor housing 216 of an exemplary smart cam lock 100 (indicated by the dashed line A-A in FIG. 2) is shown, according to one embodiment of the present disclosure. FIG. 8, in the embodiment shown, further illustrates the various components of the smart cam lock 100. In certain embodiments, the lock body 200 (and/or motor housing 216) may house a locking mechanism (e.g., locking pin 804, motor 802, actuator (not shown), etc.), a battery, a printed circuit board 810, a speaker (not shown), and any other suitable components that facilitate the functionality described herein. In particular embodiments, the lock body 200 may include one or more sensors for reading the environment and/or detecting change in or around the smart cam lock (as will be described in relation to FIG. 13). In one or more embodiments, the printed circuit board includes components that have the capability to control the locking mechanism, store, send and receive encrypted access keys (as will be further discussed herein), connect to WiFi, Private Area Networks (PAN), low power wireless connections (e.g., Bluetooth), and/or any other wireless internet access technology, and control an input means 204 (e.g., barcode scanner). In particular embodiments, the printed circuit board may also include an encryption chip for securing and securely transmitting data (e.g., access keys). In some embodiments, the barcode scanner (e.g., input means 204) fits within a static housing 806 on the smart cam lock 100. In one or more embodiments, the smart cam lock 100 also includes an antenna 808 to facilitate and improve wireless communication (e.g., via the Internet). In some embodiments, the smart cam lock 100 includes a locking pin 804 connected to the motor 802 for releasing and securing the locking pin 804 when locking and unlocking the smart cam lock 100.

In one or more embodiments, an actuator may interface with the locking pin 804 whereby the locking pin 804 helps to hold the lock arm 214 in a stationary position when the smart cam lock 100 is in a locked state. In these embodiments (and others), when the smart cam lock 100 opens, the actuator is turned which releases the locking pin 804 and allows a user to manually rotate the lock arm 214 using the rotating rubber grip 206. In some embodiments, the lock arm 214 may rotate automatically when the actuator is turned and the locking pin 804 is released. In at least one embodiment, the smart cam lock 100 may include a motor housing 216 connected to the lock arm 214. In various embodiments, the motor housing 216 secures a motor 802 connected to a battery via a power and communication cable. In these embodiments (and others), the motor 802 is powered by the battery and provides a force for turning the actuator and releasing the locking pin 804. In particular embodiments, the battery may provide a force (e.g., a torque force) for rotating the lock arm 214 to lock and unlock the smart cam lock 100 without user intervention. In certain embodiments, the battery may provide power to other components of the smart cam lock 100 (e.g., LED indicator 208, cable port 210, etc.). In some embodiments, the battery may be located inside the motor housing 216. In one or more embodiments there may be an ambient power charging mechanism (e.g., solar, thermal electric, wireless energy harnessing, etc.) providing power to the smart cam lock 100.

Figure 9:
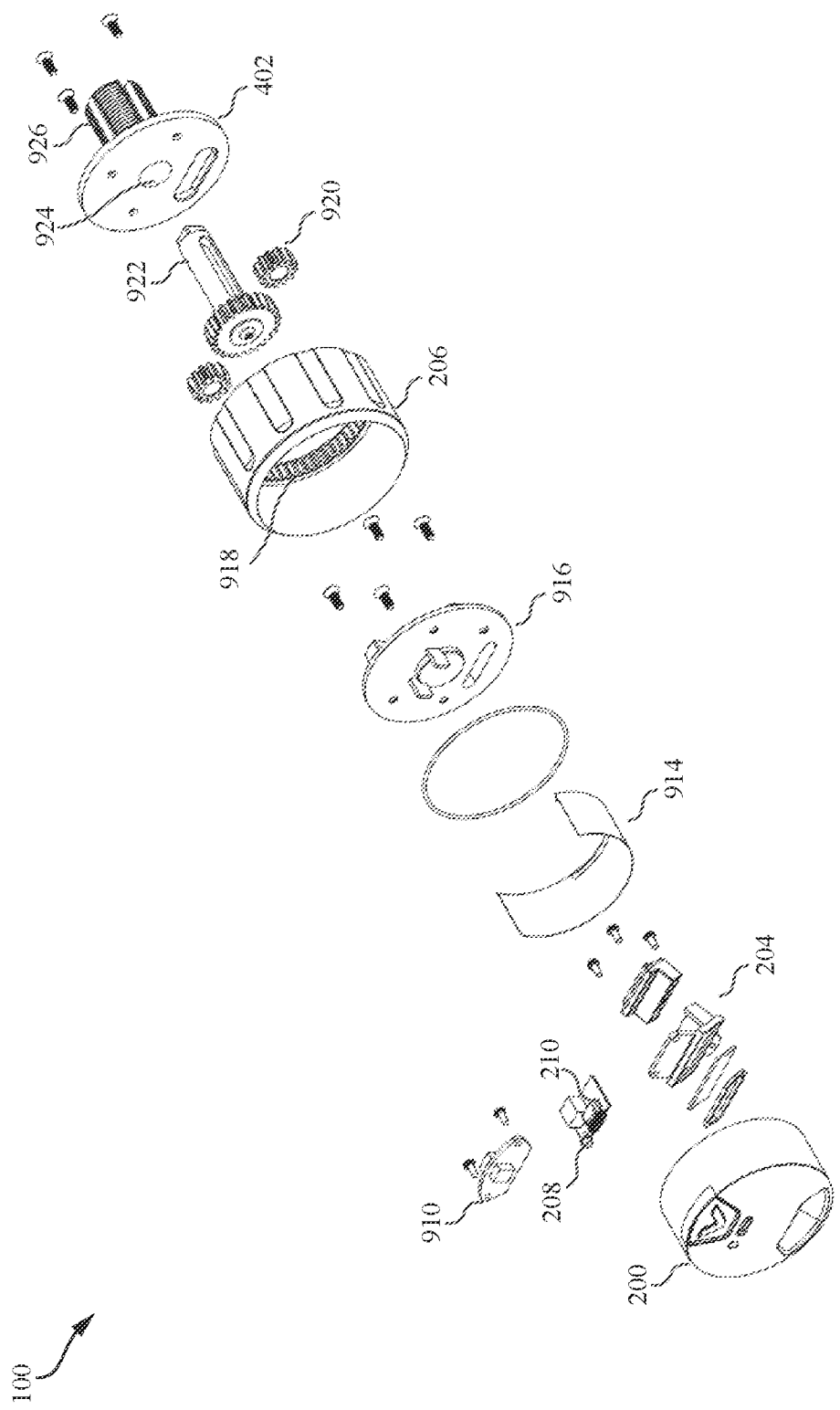
FIG. 9 illustrates an exploded view of an exemplary smart cam lock, according to one embodiment of the present disclosure.

FIG. 9 shows an exploded and disassembled view of an exemplary smart cam lock 100, according to one embodiment of the present disclosure, illustrating the various aspects of the smart cam lock 100. In the embodiment shown in FIG. 9, the lock body 200 for securing the internal components of the smart cam lock 100, the LED indicator 208 for providing status indications, the cable port 210 for connecting to power and data sources, and the rubber grip 206 for holding and rotating the smart cam lock 100, as mentioned above in the description of FIG. 2 are shown. The embodiment shown in FIG. 9 also shows an expanded view of the input means 204 for authenticating the smart cam lock 100. In particular embodiments, the input means 204 may be a barcode scanner, NFC reader, biometric scanner, camera, or any other suitable input means. In some embodiments, the smart cam lock 100 may include a button board 910 for facilitating the functionality of the activation button (as described above in relation to FIG. 2). In various embodiments, the smart cam lock 100 includes an antenna 914 for connecting to cellular networks. In some embodiments, the antenna 914 may provide extended communication range when connecting to cellular networks or any other suitable network/connection type (e.g., WiFi, Bluetooth, ZigBee, LoRaWAN, etc.). In the embodiment shown in FIG. 9, the antenna 914 is substantially semi-circular for fitting around the lock body 200, but in various embodiments, the antenna 914 may be any suitable size or shape. In one or more embodiments, the smart cam lock 100 includes a back component seal 916 for enclosing the lock body 200 and protecting the internal components housed within the lock body 200.

Continuing with the embodiment shown in FIG. 9, the exemplary smart cam lock 100 includes a grip 206 (e.g., made of rubber, plastic, silicone, vinyl, neoprene, or other tactile material) for holding and rotating the smart cam lock 100. As shown in FIG. 9, the interior circumference of the rubber grip 206 may include an internal gear 918 for facilitating the rotation of the smart cam lock 100 when locking and unlocking the same. In these embodiments (and others), the smart cam lock 100 may include various gear combinations 920 for interlocking with the internal gear 918 of the rubber grip 206. In particular embodiments, the various gear combinations 920 may include a planet and sun gear combination whereby an inside cylinder 922 is included to facilitate rotation of the rubber grip 206. In particular embodiments, a back housing seal 402 is included for enclosing the lock body 200 and securing the various components stored within the lock body 200. In one or more embodiments, the back housing seal 402 includes a bolt 926 for connecting with a lock arm (not shown) to facilitate locking and unlocking the smart cam lock 100. In at least one embodiment, the inside cylinder 922 fits securely within an opening 924 in the back housing seal 402, such that when the rubber grip 206 is rotated the interlocking gears (e.g., internal gear 918 and gear combination 920) turn, which simultaneously turns the lock arm (via the back housing seal 402 and bolt 926).

Figure 10:
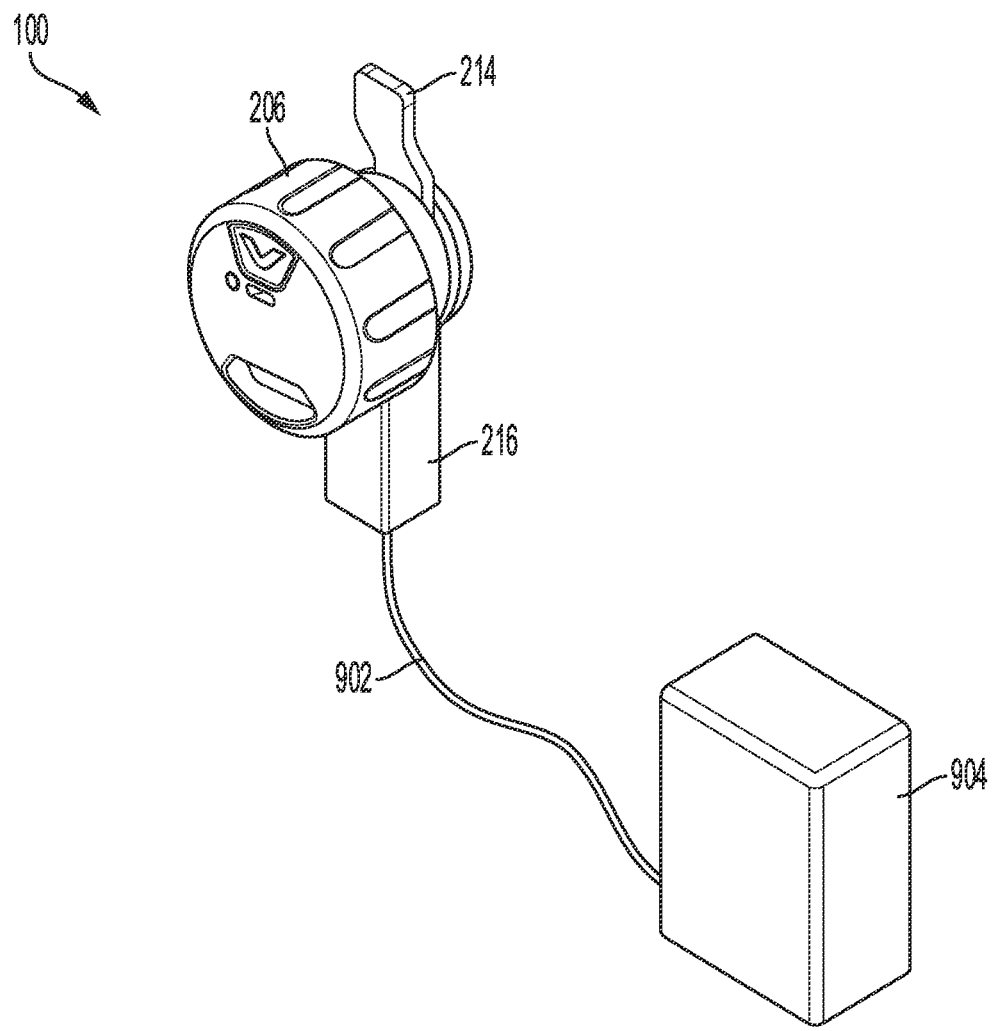
FIG. 10 illustrates a perspective view of an exemplary smart cam lock and power supply, according to one embodiment of the present disclosure.

Now referring to FIG. 10, a perspective view of an exemplary smart cam lock 100 and power supply housing 904 is shown, according to one embodiment of the present disclosure. In certain embodiments (and as described above), a motor housing 216 may provide a protective enclosure for a motor that facilitates locking and unlocking the smart cam lock 100. In various embodiments, the motor may be connected to a battery (not shown) contained with a power supply housing 904 via a power and communication cable 902. In these embodiments (and others), the power supply housing 904 provides a protective enclosure for the battery and other components (e.g., printed circuit board). In certain embodiments, the motor is powered by the battery and provides a force for releasing a locking pin to unlock the smart cam lock 100. In at least one embodiment, the battery powered motor may provide a force (e.g., a torque force) for rotating the lock arm 214 to lock and unlock the smart cam lock 100. In at least one embodiment, a user may rotate the rubber grip 206 of the smart cam lock 100 to manually turn the locking mechanism (e.g., lock arm 214). In some embodiments, a user may rotate the rubber grip 206 of the smart cam lock 100 to actuate the motor to automatically unlock the smart cam lock 100. In various embodiments, the communication cable 902 may transmit the following various data types from one or more of the following sources: power from a USB port, machine readable data from the input means, data from one or more sensors (e.g., temperature sensors, positioning sensors, etc.), audio data, network activity, user activity (e.g., if the user presses the activation button), and any other suitable data and/or data sources.

Figure 11:
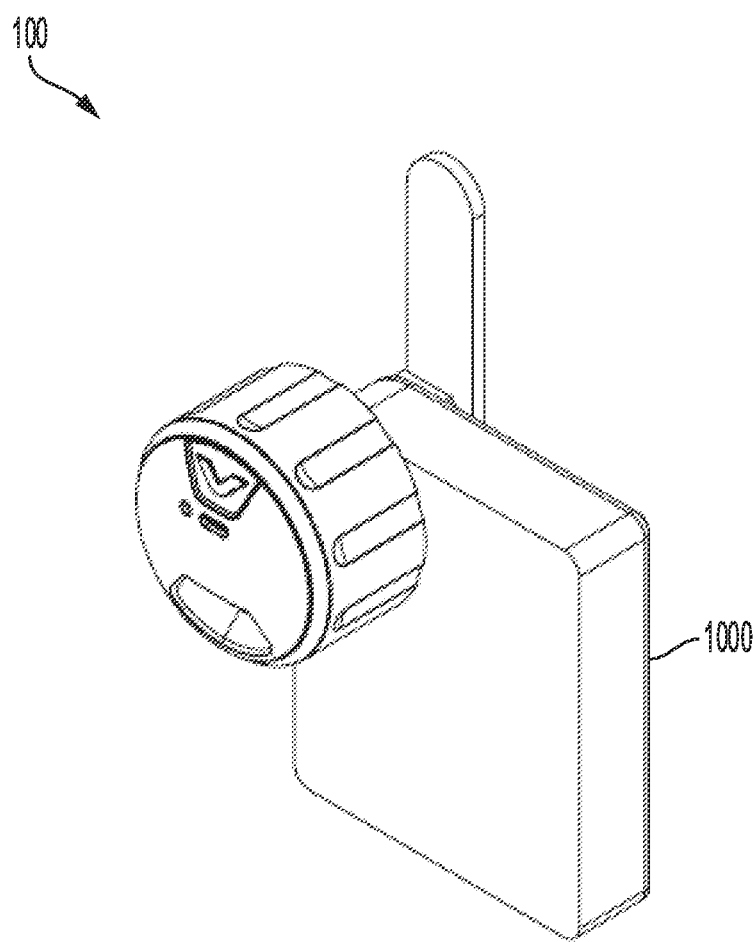
FIG. 11 illustrates a perspective view of an exemplary smart cam lock and power supply, according to one embodiment of the present disclosure.

FIG. 11 shows a perspective view of an exemplary smart cam lock 100 and motor housing 1000 (e.g., power supply), according to one embodiment of the present disclosure. In particular embodiments, the motor housing 1000 may contain a motor, a battery, a printed circuit board, one or more sensors, and any other suitable component. In some embodiments, the motor housing 1000 may substantially square shaped. In one or more embodiments, the motor housing 1000 may be any suitable shape to fit a particular use case (e.g., a square shaped power supply 1000 may fit better in particular devices than a rectangular shaped motor housing). In particular embodiments, the motor housing 1000 (and power supply) is directly connected to the smart cam lock 100 (e.g., without a communication cable). In at least one embodiment, the smart cam lock 100 may be connected to the motor housing 1000 at a corner of the motor housing 1000 such that the smart cam lock 100 may rotate without impediment.

Figure 12:
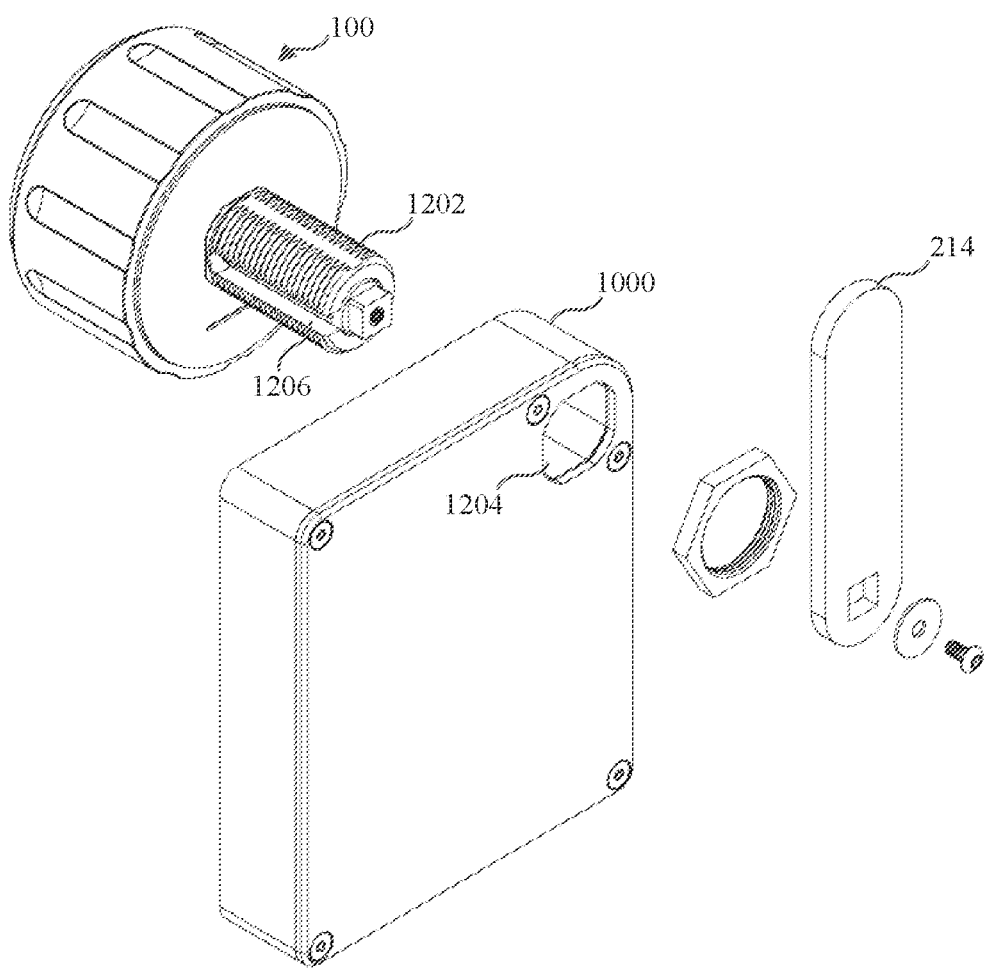
FIG. 12 illustrates an exploded view of an exemplary smart cam lock and power supply, according to one embodiment of the present disclosure.

Now referring to FIG. 12, an exploded view of an exemplary smart cam lock 100 and motor housing 1000 (e.g., power supply) is shown, according to one embodiment of the present disclosure. In particular embodiments, the smart cam lock 100 includes a locking bolt 1202 for connecting to a lock arm 214 and facilitating rotation of the same. In these embodiments (and others), the locking bolt 1202 includes a slit 1206 on a portion of the locking bolt 1202 for connecting to the motor (not shown) and providing a force for turning the locking bolt 1202. In particular embodiments, the slit 1206 may extend from the tip of the locking bolt 1202 through and until the back of the smart cam lock 100. In various embodiments, the locking bolt 1202 may be slotted through an opening 1204 in the motor housing 1000 to connect the cam lock 100 with the motor housing 1000 and the lock arm 214.

Figure 13:
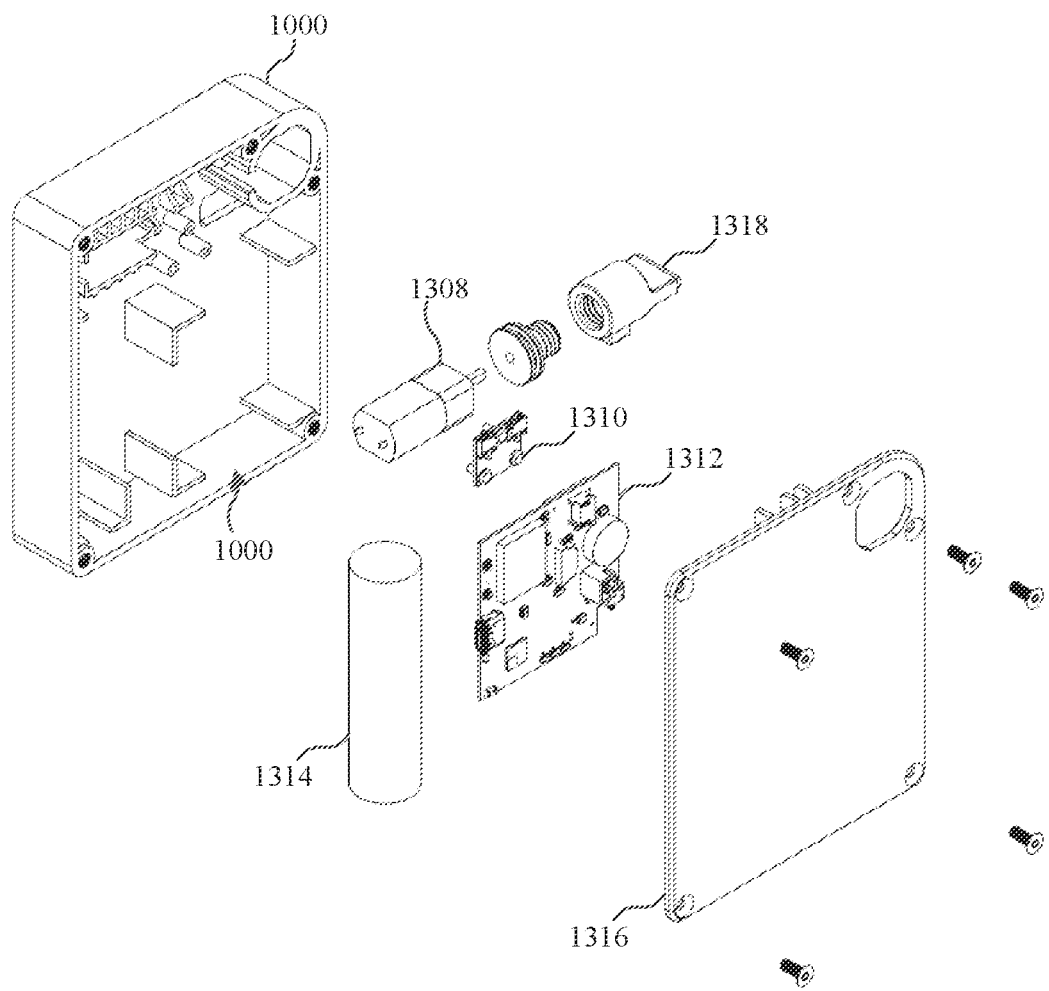
FIG. 13 illustrates an exploded view of an exemplary smart cam lock motor housing, according to one embodiment of the present disclosure.

FIG. 13 shows an exploded and disassembled view of an exemplary motor housing 1000 (e.g., power supply), according to one embodiment of the present disclosure, illustrating the various aspects of the motor housing 1000. In at least one embodiment, the exemplary motor housing may including an internal cavity 1302 for housing various internal components. The motor housing 1000, in particular embodiments, may include a bolt engagement component 1318 for engaging with the slit on the locking bolt (as described above in relation to FIG. 12.) In one or more embodiments, the bolt engagement component 1318 is connected to a motor 1308 for actuating the bolt engagement component 1318 such that the smart cam lock may be locked and unlocked (e.g., the smart cam lock may be locked when the bolt engagement component 1318 is engaged with the slit on the locking bolt and unlocked when the bolt engagement component 1318 is disengaged with the slit on the locking bolt).

In particular embodiments, the motor housing 1000 may include one or more sensors 1310 for reading the environment and/or detecting change in or around the motor housing 1000 (and smart cam lock). In various embodiments, the one or more sensors 1310 may be included in the lock body of the smart cam lock for detecting change in or around the smart cam lock. In some embodiments, the one or more sensors 1310 may include a position sensor for detecting the position of the lock (e.g., locked or unlocked). In various embodiments, the one or more sensors 1310 may include a temperature sensor for reading the temperature around the motor housing 1000 (or smart cam lock—e.g., in a container, mailbox, or other device equipped with the smart cam lock). In certain embodiments, the temperature sensor (e.g., one or more sensors 1310) may detect and trigger various responses to ambient conditions (e.g., activate warmers if temperature drops below a predetermined threshold to avoid freezing and/or damaging the components with the smart cam lock and/or motor housing 1000, transmit a signal to heaters within a container to activate and provide heat within the container, etc.). In some embodiments, the one or more sensors 1310 may detect and read third party sensors (e.g., sensors from a device placed in a container equipped with the smart cam lock). In these embodiments (and others), the one or more sensors 1310 may wirelessly transmit data collected from the third party sensors (e.g., where the third party sensors do not have wireless capabilities). In particular embodiments, the one or more sensors 1310 may include radio frequency identification ("RFID") for reading other RFID-enabled devices that may be placed within a container equipped with the smart cam lock (e.g., for counting items placed in the smart cam lock equipped container). In these embodiments (and others), the RFID sensors may be used to authenticate users (e.g., with verified RFID tags) and facilitate unlocking the smart cam lock. In at least one embodiment, the one or more sensors 1310 include an accelerometer for detecting motion (e.g., intrusive actions) of the motor housing 1000 (e.g., smart cam lock) and sending a signal if attempted intrusion is detected. In these embodiments (and others) the one or more sensors 1310 may include a machine learning component to identify various types of motion (e.g., brute force, sawing actions, etc.) and send signals accordingly. In various embodiments, the one or more sensors 1310 may send a signal (e.g., to the main board 1312, smart cam lock, etc.) upon conducting any reading or detecting any change.

Continuing with the embodiment shown in FIG. 13, in at least one embodiment, the motor housing 1000 includes a battery 1314 for providing power to various internal components of the motor housing 1000. In certain embodiments, the motor housing 1000 may include a main board for controlling the motor 1308, one or more sensors 1310, battery 1314, and communication with the smart cam lock.

Figure 14:
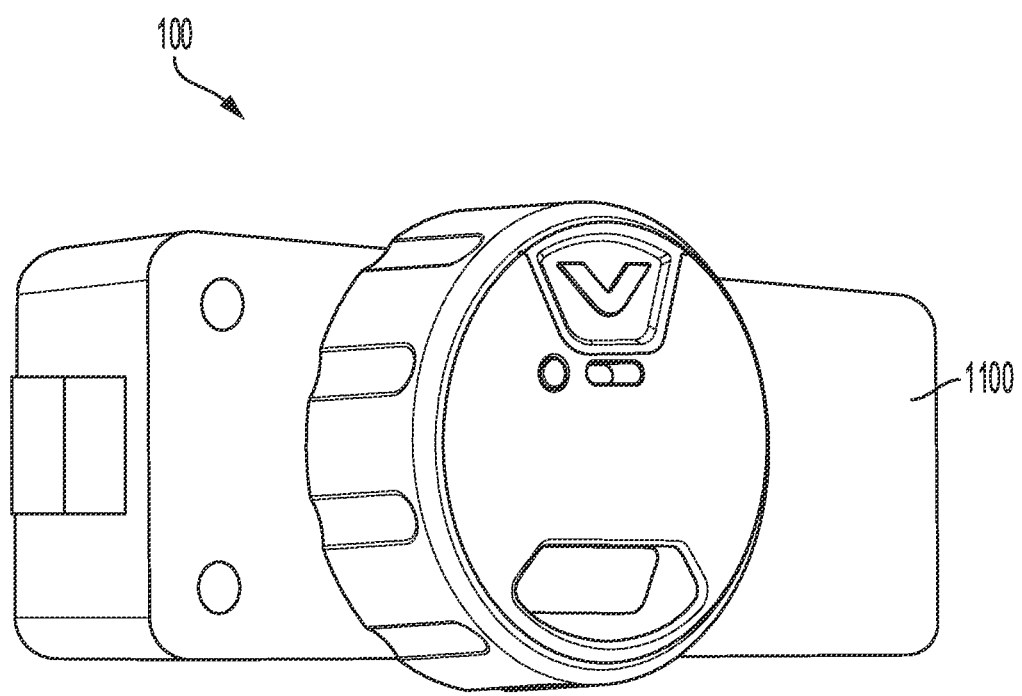
FIG. 14 illustrates a perspective view of an exemplary smart cam lock and power supply, according to one embodiment of the present disclosure.

Turning now to FIG. 14 a perspective view of an exemplary smart cam lock 100 and motor housing 1100 (e.g., power supply) is shown, according to one embodiment of the present disclosure. In particular embodiments, the motor housing 1100 may be a substantially rectangular cuboid or any other suitable shape (e.g., cylindrical). In various embodiments, the motor housing 1100 may be integrally connected to the lock arm such that the motor housing 1100 engages and disengages with a rigid structure (e.g., of a container, mailbox or other device equipped with the smart cam lock 100 (e.g., "equipped device")). In these embodiments, the motor housing 1100 rotates concurrently with the rotation of the smart cam lock 100. In various embodiments, an equipped device is locked when the motor housing 1100 is rotated to a vertical position (e.g., 180 degrees relative to the ground) and engaged with a rigid structure such that the equipped device is prevented from opening. In certain embodiments, an equipped device is unlocked when the motor housing 1100 is rotated to a horizontal position (e.g., 90 degrees relative to the ground) and disengaged from a rigid structure such that the equipped device is allowed to open. In at least one embodiment, the equipped device may unlock when the motor housing 1100 is positioned at various angles relative to the ground (e.g., 115 degrees, 150 degrees, etc.). In some embodiments, the enclosure of the motor housing 1100 may be manufactured from plastic, metal, steel, carbide or any other suitable material.

Figure 15:
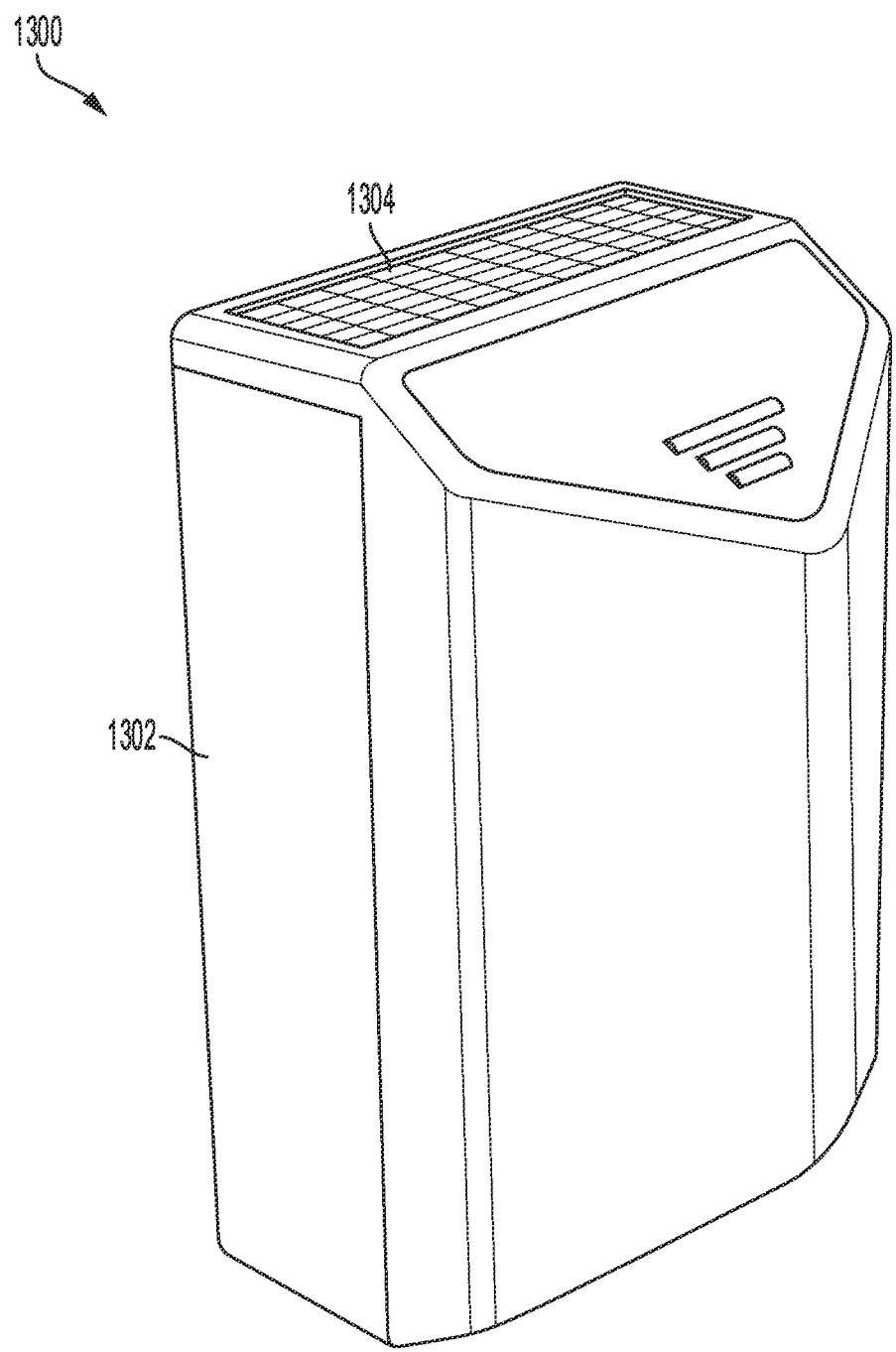
FIG. 15 illustrates a perspective view of an exemplary smart key lock box in a closed state, according to one embodiment of the present disclosure.

Now referring to FIG. 15, a perspective view of an exemplary smart key lock box 1300 is shown in a closed state, according to one embodiment of the present disclosure. In various embodiments the smart key lock box 1300 includes a lock housing 1302 for providing a protective enclosure for storing items. In some embodiments, the lock housing 1302 is substantially trapezoidal in shape. In one or more embodiments, the lock housing 1302 may be cuboid, cylindrical, or any other suitable shape. In particular embodiments, the lock housing 1302 may be manufactured from plastic, metal, steel, carbide or any other suitable material. In one or more embodiments, the lock housing 1302 includes a solar panel 1304 or other similar power source on the uppermost surface to facilitate power generation for the smart key lock box 1300. In particular embodiments, and as shown in FIG. 15, the solar panel 1304 may be substantially rectangular in shape. In certain embodiments, the solar panel 1304 may be circular, triangular, or any other suitable shape.

Figure 16:
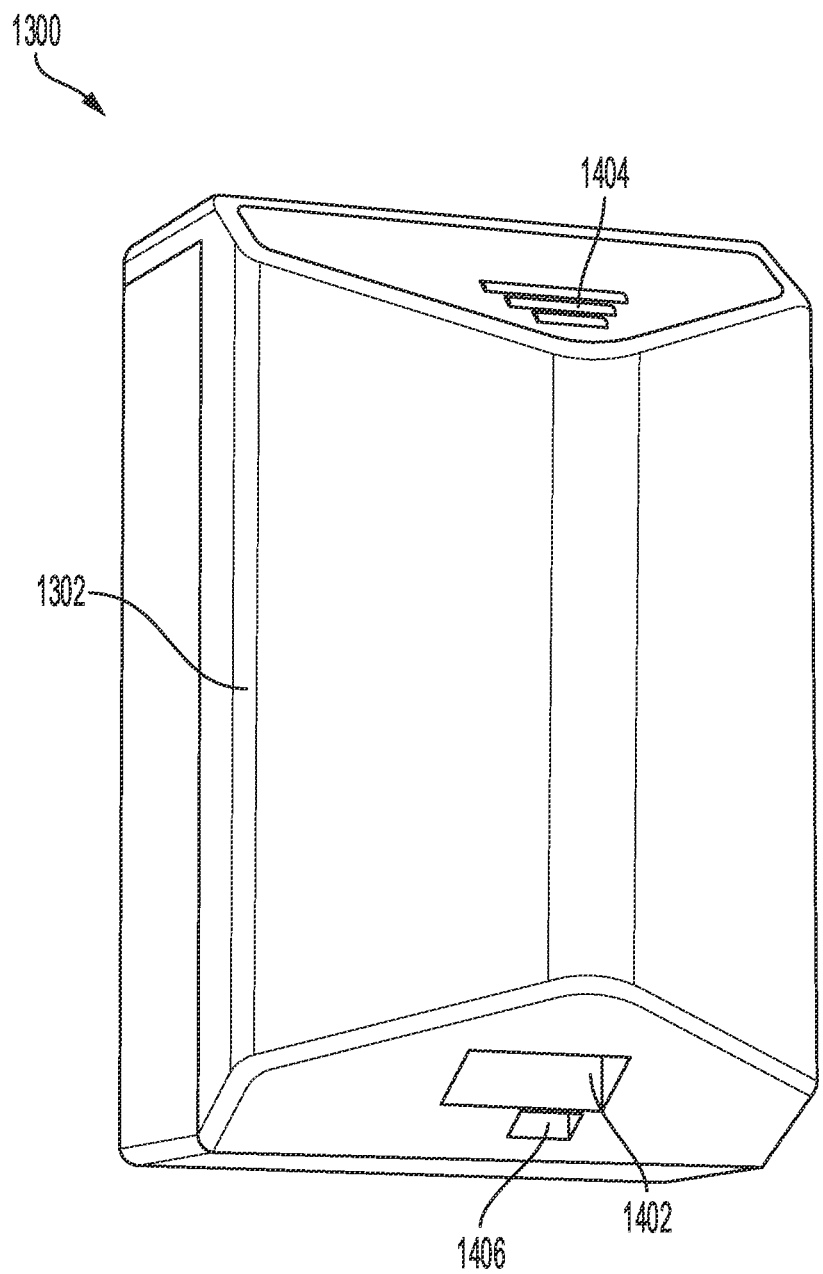
FIG. 16 illustrates a perspective view of an exemplary smart key lock box in a closed state, according to one embodiment of the present disclosure.

FIG. 16 shows a perspective view of an exemplary smart key lock box 1300 in a closed state, according to one embodiment of the present disclosure. In some embodiments, the smart key lock box 1300 includes an input means 1402 (e.g., barcode scanner) for authentication purposes. In some embodiments, the input means 1402 is generally located underneath the smart key lock box 1300. In particular embodiments, the lock housing 1302 may include a button 1404 for activating and deactivating the input means 1402. In one or more embodiments, the input means 1402 is a barcode scanner for scanning barcodes, QR codes, or other suitable machine-readable data. In some embodiments, the input means 1402 may be a fingerprint scanner, NFC reader, camera (e.g., for facial recognition), microphone, or any other suitable input that performs the functionality described herein. In at least one embodiment, the input means 1402 facilitates user authentication such that the smart key lock box 1300 may be opened.

Continuing with the embodiment shown in FIG. 16, the exemplary smart key lock box 1300 may include a cable port 1406 for connecting the smart key lock box 1300 to an exterior power source. In particular embodiments, the cable port 1406 may provide for connection to one or more third-party systems (e.g., computers, smart phones, tablets, etc.). In some embodiments, the cable port 1406 may accept USB cables. In these embodiments (and others), the cable port 1406 may accept USB-A, USB-B, USB-C, micro-USB, mini-USB, USB 3.0, or any other suitable cable (e.g., RCA, HDMI, Ethernet, etc.).

Figure 17:
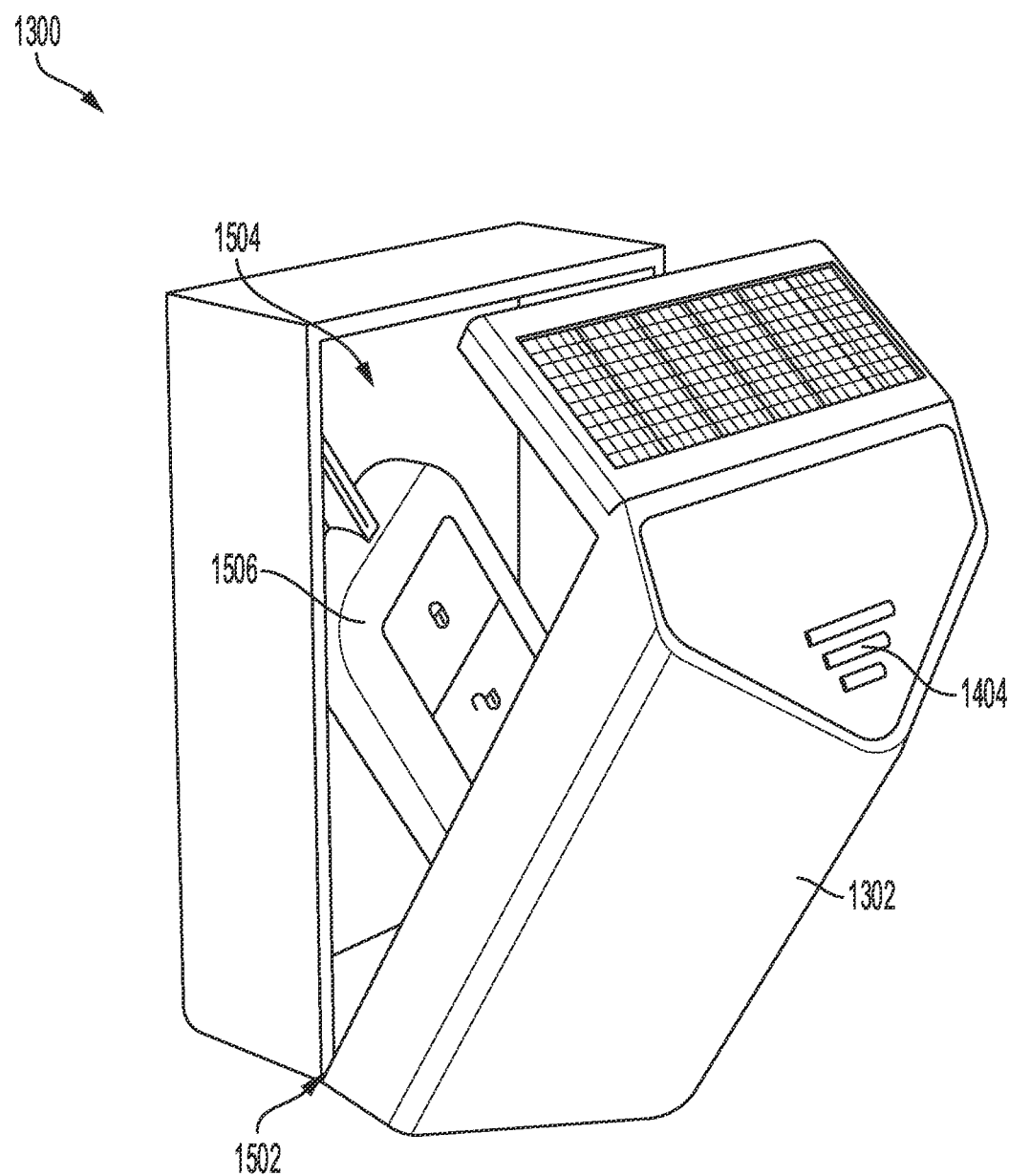
FIG. 17 illustrates a perspective view of an exemplary smart key lock box in an open state, according to one embodiment of the present disclosure.

Turning now to FIG. 17, a perspective view of an exemplary smart key lock box 1300 is shown in an opened state, according to one embodiment of the present disclosure. In particular embodiments, and as shown in FIG. 17, the lock housing 1302 may open about a hinged (or other rotatable) connection 1502 such that a storage space 1504 is revealed for placing items 1506 (e.g., physical keys to unlock a door to a home or car, key fobs, valuables, etc.) inside the smart key lock box 1300. In at least one embodiment, the lock housing 1302 is opened when a user presses the button 1404 to activate the input means 1402 (not shown) and then authenticates using the input means. In one or more embodiments, the barcode scanner (e.g., input means) may facilitate authentication of a smart key lock box 1300 user by scanning a barcode and converting the barcode information into an access key. In certain embodiments, the user may obtain the barcode to be scanned from a central management system via software associated with the smart key lock box 1300. In one or more embodiments, users may obtain a barcode from the owner or administrator of the smart key lock box 1300. In certain embodiments, users may display the barcode for scanning on a mobile device (e.g., smartphone, tablet computer, handheld computer, etc.). In one or more embodiments, the barcode may be displayed on a physical device (e.g., a key tag or other suitable device). In one or more embodiments, the access key generated from the barcode may be used to grant or deny a user permission to open the lock housing 1302 of the smart key lock box 1300.

In one or more embodiments, a printed circuit board (not shown) is located within the lock housing 1302 that contains components that have the capability to control the locking mechanism, store, send and receive encrypted access keys, connect to WiFi and/or Bluetooth (or any other wireless internet access technology) and control the input means 1402 (e.g., barcode scanner), as discussed in U.S. patent application Ser. No. 15/586,512, filed on May 4, 2017, and entitled "Package Securing System"; PCT/US2018/062834, filed on Nov. 28, 2018, and entitled "Systems, Apparatuses, and Methods for Securing Deliveries"; and PCT Patent Application No. PCT/US19/19374, filed on Feb. 25, 2019, and entitled "Modular Smart Padlock System for Protection of Distributed Assets," the disclosures of which are incorporated herein by reference in their entireties.

Figure 18:
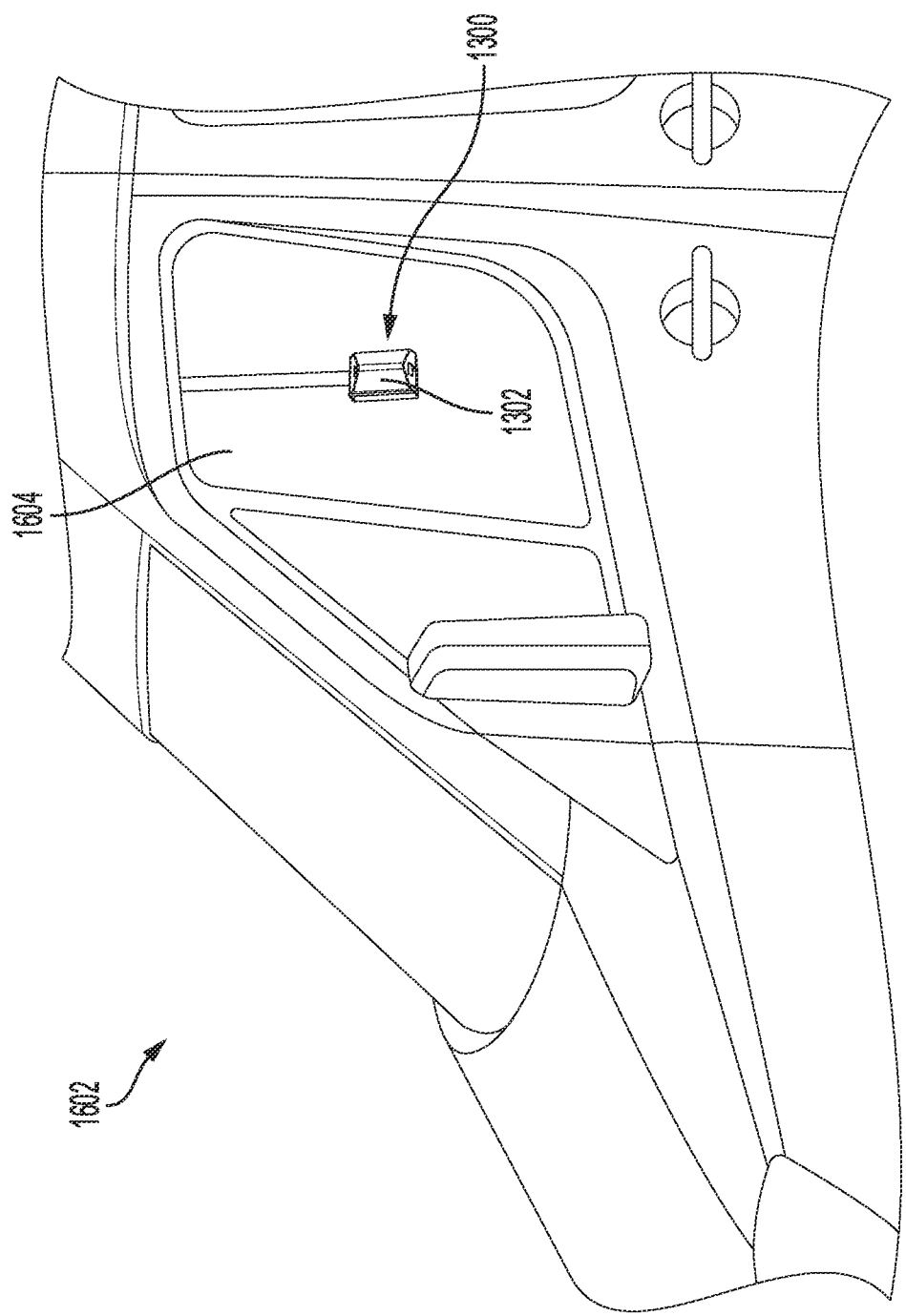
FIG. 18 illustrates a perspective view of an exemplary use case for an exemplary smart key lock box, according to one embodiment of the present disclosure.

FIG. 18 shows an exemplary smart key lock box 1300 use case, according to one embodiment of the present disclosure. In particular, FIG. 18 shows an exemplary smart key lock box 1300 positioned outside of a vehicle 1602 driver door window 1604. In this exemplary use case, a user needing to park a vehicle 1602 in a public location for a second user to pick up at a later date/time may use the smart key lock box 1300 to securely store the keys for the vehicle 1602. In this example, the user may program the smart key lock box 1300 with an access key that is subsequently provided to the second user (e.g., via email, instant messaging, text messaging, or other suitable wireless communication method). When the second user picks up the vehicle, the second user can then apply the access key (e.g., using the second user's mobile device) to the smart key lock 1300 box via the input means to open the lock housing 1302 and retrieve the vehicle keys.

In some embodiments, the access key (i.e., a digital key rather than a physical key used to unlock the lock box) is stored at a central management system. In various embodiments, upon a user's attempt to authenticate via the input means, the control unit securely transmits an access key generated from the input means and a unique identifier of the smart key lock box to the central management system via wireless communication for authentication. Continuing with this embodiment, the central management system checks its access list to confirm that the access key is valid for that particular smart key lock box. In one embodiment, the central management system also receives and confirms that the location data corresponding to the smart key lock box is correct. In various embodiments, in the event of a valid access key for the particular smart key lock box, the central management system sends the control unit command (e.g., an encrypted signal or transmission) to open the smart key lock box. In certain embodiments, upon opening the lock housing of the smart key lock box, the system reports and stores the status of the lock and the time of the unlock event. In the event of a failed access key for the particular lock housing unit, the central management system commands the control unit to not open the smart key lock box or does not send an encrypted command to open the smart key lock box. In certain embodiments, in the event of a failed or repeated failed access attempts at the smart lock box, the lock box 100 may notify a system user or authorities of the attempts at unauthorized entry or access, such that law enforcement personnel can be deployed or other action can be taken.

The exemplary use case described in connection with FIG. 18 is not intended to limit or distinguish use of the smart key lock box 1300. In various embodiments, the smart key lock box 1300 may be used by real estate professionals to securely store house keys outside of a home for sale. In particular embodiments, the smart key lock box 1300 may be used by first responders needing to enter a home to assist an individual needing medical assistance. In one or more embodiments, the smart key lock box 1300 may be appropriate for any user having a need to securely store items in publicly accessible locations.

To provide further details on the authentication system described above, in various embodiments, a smart cam lock and/or smart key lock box 1300 includes a barcode scanner (e.g., input means) for accepting access keys and authenticating users. In certain embodiments, access keys (and/or barcodes) may be stored on the smart cam lock and/or smart key lock box 1300. In these embodiments (and others), access keys (and/or barcodes) stored on the smart cam lock and/or smart key lock box 1300 may be used a limited number of times (e.g., once, twice, five times, etc.). In at least one embodiment, access keys stored on the smart cam lock and/or smart key lock box 1300 may have unlimited usage. In some embodiments, access keys (and/or barcodes) stored on the smart cam lock and/or smart key lock box 1300 may be invalidated and/or replaced after a predetermined amount of time (e.g., two hours, four hours, twelve hours, twenty-four hours, etc.) In particular embodiments, access keys (and/or barcodes) may be stored at a central management system.

In one or more embodiments, the barcode scanner may facilitate authentication of a smart cam lock and/or smart key lock box 1300 user by scanning a barcode and converting the barcode information into an access key. In certain embodiments, the user may obtain the barcode to be scanned from a central management system via software associated with the smart cam lock and/or smart key lock box 1300. In one or more embodiments, users may obtain a barcode from the owner or administrator of the smart cam lock and/or smart key lock box 1300. In at least one embodiment, the barcode to be scanned may be located on the exterior surface of mail to be delivered. In certain embodiments, users may receive a barcode from the central management system or some other system and then display the barcode for scanning on a mobile device (e.g., smartphone, tablet computer, handheld computer, etc.). In one or more embodiments, the barcode may be displayed on a physical device (e.g., a key tag or other suitable device). In one or more embodiments, the access key generated from the barcode may be used to grant or deny a user permission to unlock the smart cam lock and/or smart key lock box. In particular embodiments, in lieu of a barcode scanner, the smart cam lock may include a fingerprint scanner, NFC reader, camera, microphone, or any other suitable input that performs the functionality described herein. In certain embodiments, and as shown in the figures and described above, the barcode scanner (e.g., input means) may be included on the front surface of the lock body of the smart cam lock or the underside of the lock housing of the smart key lock box. In at least one embodiment (not shown), the barcode scanner may be included on the bottom surface of the lock body of the smart cam lock. In one or more embodiments, the smart cam lock and/or smart key lock box 1300 may include an activation button for activating and deactivating the input means (e.g., barcode scanner). In various embodiments, and as shown in the figures, the activation button may be on the upper portion of the front surface of the smart cam lock and/or smart key lock box 1300. In some embodiments, the activation button may be positioned at an angle away from the front surface to facilitate usage of the activation button.

In some embodiments, access keys may be stored at a central management system. In various embodiments, upon a user's attempt to authenticate via the barcode scanner (e.g., input means), a control unit may check the smart cam lock and/or smart key lock box 1300 to determine if the access key generated from the input means matches an access key stored on the smart cam lock and/or smart key lock box 1300. If the access key does not match an access key stored on the smart cam lock and/or smart key lock box 1300, then the control unit securely transmits the access key generated from the input means and a unique identifier of the smart cam lock and/or smart key lock box 1300 to the central management system via wireless communication for authentication. Continuing with this embodiment, the central management system checks an access list to confirm that the access key is valid for that particular smart cam lock and/or smart key lock box 1300. In one embodiment, the central management also receives and confirms that the location data corresponding to the smart cam lock and/or smart key lock box 1300 is correct. In various embodiments, in the event of a valid access key for the particular smart cam lock and/or smart key lock box 1300, the central management system sends the control unit an encrypted command to unlock the smart cam lock and/or smart key lock box 1300. In certain embodiments, upon unlocking the smart cam lock and/or smart key lock box 1300, the system reports and stores the status of the smart cam lock and/or smart key lock box 1300 and the time of the unlock event. In the event of a failed access key for the particular smart cam lock and/or smart key lock box 1300, the central management system commands the control unit to not unlock the smart cam lock and/or smart key lock box 1300 or does not send an encrypted command to unlock the smart cam lock and/or smart key lock box 1300.

In at least one embodiment, a smart cam lock and/or smart key lock box 1300 may be opened via remote authorization (e.g., "Press to Open" functionality). In these embodiments (and others), authorization to open the lock is granted remotely (e.g., via a mobile application, computer software, or other suitable means). In particular embodiments, remote authorization triggers the lock system software to open the smart cam lock and/or smart key lock box 1300 upon receipt of a completed action on the smart cam lock and/or smart key lock box 1300 (e.g., pushing the activation button, triggering the accelerometer, voice command, etc.). In various embodiments, if the action to be completed is not completed within a predetermined time period (e.g., less than thirty minutes, less than one hour, less than twenty-four hours, etc.), then authorization to open the smart cam lock and/or smart key lock box may be rescinded. In one or more embodiments, if authorization to open the smart cam lock and/or smart key lock box 1300 is rescinded, then the completing an action on the smart cam lock and/or smart key lock box 1300 will not trigger the lock system software to open the lock.

Now referring to FIG. 19, an exemplary flowchart of a lock opening process 1900 is shown, according to one embodiment of the present disclosure. A smart cam lock or smart key lock box, in various embodiments, may be linked to lock system software to manage the locks and facilitate locking and unlocking the locks. In particular embodiments, the lock system software may be configured with identifying data to facilitate lock management. Thus, it is important to establish a process by which smart cam locks and smart key lock boxes may communicate with the lock system software to control and monitor lock access. As will be understood by one having ordinary skill in the art, the steps and processes shown in FIG. 19 (and those of all other flowcharts and sequence diagrams shown and described herein) may operate concurrently and continuously, are generally asynchronous and independent, and are not necessarily performed in the order shown.

In one embodiment, and as shown in FIG. 19, the exemplary process 1900 begins with step 1902, where the system is configured to receive device programming data. In various embodiments, the device programming data may include a device identification (ID) number, device location information, one or more device access keys, and other suitable information. In various embodiments, the device programming data may be stored in a database (virtual or physical) and managed by lock system software. In certain embodiments, the device programming data may be entered manually (e.g., via a user interface of the lock system software). In at least one embodiment, the device programming data may be received automatically (e.g., upon scanning a barcode that may generated by the lock system software). In certain embodiments, the device ID is sequence of characters unique to a particular device. In various embodiments, the system may generate one or more unique access keys to be associated (i.e., linked) to a particular device ID. In one or more embodiments, the system may generate the one or more unique access keys using one or more code generation algorithms (e.g., random, probabilistic, pseudorandom/deterministic, etc.). In various embodiments, the access keys may be encrypted using one or more encryption techniques (e.g., symmetric, asymmetric, Data Encryption Standard, Advanced Encryption Standard, Rivest-Shamir-Adleman Encryption, Blowfish, Twofish, Format Preserving Encryption, etc.).

At step 1904, in particular embodiments, the system receives machine-readable data. In certain embodiments, the machine-readable data is received after the smart cam lock or smart key lock box scans a barcode or other machine-readable dataset (e.g., on a package label or other barcode, QR code, etc.). In certain embodiments, the machine-readable data is received over any suitable wireless communication protocol (e.g., TCP, TLS, HTTP, HTTPS, UDP, FTP, etc.) operating on any suitable wireless network (e.g., WiFi, Bluetooth, ZigBee, etc.). In these embodiments (and others), the machine-readable data is received over an encrypted wireless communication protocol. In various embodiments, the system is configured to extract an access key from the machine-readable data.

At step 1906, in certain embodiments, the system retrieves the device ID and the location data from the smart cam lock or key lock box. In particular embodiments, the location data is retrieved as GPS coordinates generated by the smart cam lock's or smart key lock box's onboard GPS unit. In at least one embodiment, the system retrieves the device ID and location data over any suitable wireless communication protocol (e.g., TCP, TLS, HTTP, HTTPS, UDP, FTP, etc.) operating on any suitable wireless network (e.g., WiFi, Bluetooth, ZigBee, etc.).

If the access key extracted at step 1904 and the location data and device ID retrieved at step 1906 do not match the programming data received at step 1902, then system transmits a failure to authenticate message and terminates the process. However, in at least one embodiment, if the access key extracted at step 1904 and the location data and device ID retrieved at step 1906 match the programming data received at step 1902, then system is configured to transmit a signal to the smart cam lock or smart key lock box indicating that the device may be unlocked. In particular embodiments, upon unlocking the device, the lock system software may record one or more details of the unlock event (e.g., date and time of unlock, location, temperature, identification of user that triggered the unlock, etc.). In some embodiments, the lock system software may record one or more details after any event associated with the smart cam lock or smart key lock box (e.g., locked, unlocked, failed unlock attempt, scanner (e.g., input means) triggered, activation button pushed, accelerometer triggered, network connection lost, network connection established, location changed, or any other suitable event).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hard-wired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed technology will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the technology to the precise forms disclosed. Many modifications and variations are possible in light of the above teaching.

The embodiments were chosen and described in order to explain the principles of the technology and their practical application so as to enable others skilled in the art to utilize the technology and various embodiments and with various modifications as are suited to the particular use contemplated. Alternative embodiments will become apparent to those skilled in the art to which the technology pertains without departing from their spirit and scope. Accordingly, the scope of the present technology is defined by the appended claims rather than the foregoing description and the exemplary embodiments described therein.

What is claimed is:

1. An electronic cam lock, comprising:
    a cylindrical lock body encircled by a rotatable hand grip, wherein the rotatable hand grip is configured to rotate a cam rotatably affixed to a rear of the cylindrical lock body, wherein the cylindrical lock body further comprises an internal cavity and a front surface;
    a scannable media scanner embedded within the internal cavity of the cylindrical lock body and at least partially exposed out of the front surface of the cylindrical lock body, the scannable media scanner being configured to read scannable media that is external to the cylindrical lock body;
    an actuation button disposed on the front surface of the cylindrical lock body and operatively connected to the scannable media scanner, wherein the actuation button is configured to actuate the scannable media scanner when pressed; and
    a power supply operatively connected to the barcode scanner and the actuation button.

2. The cam lock of claim 1, wherein the scannable media comprises a bar code or QR code.

3. The cam lock of claim 1, further comprising an accelerometer operatively connected to the cylindrical lock body and configured to detect movement of the cylindrical lock body.

4. The cam lock of claim 3, wherein movement detected by the accelerometer is compared to one or more predefined rules corresponding to acceptable movement of the cylindrical lock body, and upon determination that the movement exceeds one or more movement thresholds, taking a predetermined action by a processor operatively connected to the accelerometer.

5. The cam lock of claim 4, wherein the predetermined action is selected from the group comprising: transmitting a communication to an external system indicating unacceptable movement of the cylindrical lock body, preventing rotating of the rotatable hand grip and movement of the cam, logging the movement.

6. The cam lock of claim 1, further comprising a global positioning system (GPS) embedded within the interval cavity of the cylindrical lock body or operatively connected to the cylindrical lock body and configured to identify a location of the cam lock.

7. The cam lock of claim 1, further comprising WiFi or cellular connectivity embedded within the cylindrical lock body.

8. The cam lock of claim 7, further comprising an annular antenna that at least partially encircles an interior of the cylindrical lock body to enable the WiFi or cellular connectivity.

9. The cam lock of claim 1, further comprising an RFID reader operatively connected to the cylindrical lock body and configured to read RFID tags affixed to objects external to the cylindrical lock body.

10. The cam lock of claim 1, wherein the internal circumference of the rotatable hand grip comprises gear teeth configured to rotate gears operatively connected to the cam.

11. The cam lock of claim 1, wherein an outer circumference of the rotatable hand grip comprises a plurality of grippable indentions.

12. The cam lock of claim 1, further comprising a temperature sensor operatively connected to the cylindrical lock body and configured to read a temperature of an object receptacle affixed to the cylindrical lock body and transmit the temperature to a remote system.

13. The cam lock of claim 12, wherein the temperature sensor is configured to read an object temperature emitted from a temperature emitter associated with an object to be placed in the object receptacle affixed to the cylindrical lock body and, if the object temperature meets or exceeds a predetermined threshold, initiate a notification to the remote system.

14. The cam lock of claim 1, further comprising a USB interface embedded within the cylindrical lock body.

15. The cam lock of claim 1, further comprising a motor operatively connected to the cam and figured to automatically rotate the cam.

16. An electronic cam lock system, comprising:
    a cylindrical lock body encircled by a rotatable hand grip, wherein the rotatable hand grip is configured to rotate a cam rotatably affixed to the cylindrical lock body;
    a scannable media scanner embedded within the cylindrical lock body and at least partially exposed out of a surface of the cylindrical lock body, the scannable media scanner being configured to read scannable media that is external to the cylindrical lock body;
    a local storage operatively connected to the cylindrical lock body; and
    a processor operatively connected to the cylindrical lock body, the scannable media scanner, and the local storage, the processor being operative to:

receive a plurality of datasets corresponding to a plurality of temporary scannable media files from a remote system, wherein at least one of the temporary scannable media files corresponds to a package expected to be delivered to an address associated with the electronic cam lock system;

store the plurality of datasets in the local storage;

read a particular scannable media file presented at the electronic cam lock system via the scannable media scanner;

extract data from the particular scannable media file and compare the extracted data to the plurality of datasets corresponding to the plurality of temporary scannable media files in the local storage; and upon determination that the extracted data matches at least one of the plurality of datasets, unlock the cam by enabling rotation of the rotatable hand grip.

17. The cam lock system of claim 16, wherein prior to reading the particular scannable media file presented at the electronic cam lock system, the processor is further operative to:

determine that a predetermined time period has passed;

delete the plurality of datasets corresponding to the plurality of temporary scannable media files;

receive a new plurality of datasets corresponding to a new plurality of temporary scannable media files from the remote system, wherein at least one of the new temporary scannable media files corresponds to the package expected to be delivered to the address associated with the electronic cam lock system; and store the new plurality of datasets in the local storage for subsequent comparison to the particular scannable media file.

18. The cam lock system of claim 16, wherein the scannable media files comprise barcodes or QR codes.

19. The cam lock system of claim 16, further comprising an accelerometer operatively connected to the cylindrical lock body and the processor, and configured to detect movement of the cylindrical lock body.

20. The cam lock system of claim 19, wherein the processor is further operative to:

receive an indication from the accelerometer that movement of the cylindrical lock body is detected;

retrieve one or more predefined rules from the local storage, wherein the one or more predefined rules correspond to acceptable movement of the cylindrical lock body;

compare the movement of the cylindrical lock body detected by the accelerometer to the one or more predefined rules; and upon determination that the movement exceeds one or more movement thresholds defined by the one or more predefined rules, initiate a predetermined action.

21. The cam lock system of claim 16, further comprising a global positioning system (GPS) operatively connected to the cylindrical lock body and configured to identify a location of the cylindrical lock body.

22. The cam lock system of claim 16, further comprising WiFi or cellular connectivity embedded within the cylindrical lock body.

23. The cam lock system of claim 22, further comprising an annular antenna that at least partially encircles an interior of the cylindrical lock body to enable the WiFi or cellular connectivity.

24. The cam lock system of claim 16, further comprising an RFID reader operatively connected to the cylindrical lock body and figured to read RFID tags affixed to objects external to the cylindrical lock body.

25. The cam lock system of claim 16, wherein the internal circumference of the rotatable hand grip comprises gear teeth configured to rotate gears operatively connected to the cam.

26. The cam lock system of claim 16, wherein an outer circumference of the rotatable hand grip comprises a plurality of grippable indentions.

27. The cam lock system of claim 16, further comprising a temperature sensor operatively connected to the cylindrical lock body and configured to read a temperature of an object receptacle affixed to the cylindrical lock body.

28. The cam lock system of claim 27, wherein the temperature sensor is configured to read an object temperature emitted from a temperature emitter associated with an object to be placed in the object receptacle affixed to the cylindrical lock body and, if the object temperature meets or exceeds a predetermined threshold, initiate a notification by the processor to the remote system.

* * * * *